United States Patent
Kawabata et al.

(10) Patent No.: US 9,747,681 B2
(45) Date of Patent: Aug. 29, 2017

(54) MEASURING APPARATUS, MEASUREMENT METHOD, INFORMATION PROCESSING APPARATUS, AND MEASUREMENT PROGRAM

(71) Applicant: PROSPER CREATIVE CO., LTD., Tokyo (JP)

(72) Inventors: Hideki Kawabata, Tokyo (JP); Akira Kijima, Tokyo (JP)

(73) Assignee: PROSPER CREATIVE CO., LTD., Tokyo (JP)

( * ) Notice: Subject to any disclaimer, the term of this patent is extended or adjusted under 35 U.S.C. 154(b) by 49 days.

(21) Appl. No.: 14/780,149

(22) PCT Filed: Mar. 24, 2014

(86) PCT No.: PCT/JP2014/057994
§ 371 (c)(1),
(2) Date: Sep. 25, 2015

(87) PCT Pub. No.: WO2014/157042
PCT Pub. Date: Oct. 2, 2014

(65) Prior Publication Data
US 2016/0042504 A1    Feb. 11, 2016

(30) Foreign Application Priority Data

Mar. 27, 2013  (JP) .................. 2013-065935

(51) Int. Cl.
*G06K 9/00*    (2006.01)
*G06T 7/00*    (2017.01)
(Continued)

(52) U.S. Cl.
CPC .......... *G06T 7/001* (2013.01); *B41F 33/0045* (2013.01); *B41F 33/02* (2013.01);
(Continued)

(58) Field of Classification Search
CPC .. B41F 33/00; B41F 33/0036; B41F 33/0045; B41F 33/02; B41P 2233/51;
(Continued)

(56) References Cited

U.S. PATENT DOCUMENTS 5,087,126 A * 2/1992 Pochieh .................... G01J 3/46
355/38
5,140,413 A * 8/1992 Suzuki .................. H04N 1/401
358/500
(Continued)

FOREIGN PATENT DOCUMENTS

CA    2732168 A1    9/2011
CN    101172415 A    5/2008
(Continued)

OTHER PUBLICATIONS

Mar. 31, 2016 Search Report issued in European Patent Application No. 14774087.
(Continued)

*Primary Examiner* — Vu Le
*Assistant Examiner* — Aklilu Woldemariam
(74) *Attorney, Agent, or Firm* — Oliff PLC

(57) ABSTRACT

A measurement apparatus for measuring values for color adjustments in a print technique includes a measurement instrument including a measurement value detecting device at an arbitrary measurement point, a movement device, a reference coordinate calculation device, a measurement coordinate calculation device, and a computation device. The reference coordinate calculation device calculates a measurement point reference coordinate value. The measurement coordinate calculation device compares both origins to calculate a corrected value relative to the coordinate system of the reference-image, and corrects the position of the measurement origin based on the corrected value to (Continued)

correct the reference coordinate value and calculates a measurement coordinate value in the coordinate system of the measurement-image corresponding to the measurement point of the reference-image. The computation device calculates information for comparing and evaluating the measurement value acquired at the measurement point of the reference-image and the measurement value acquired at the measurement point of the measurement-image.

15 Claims, 15 Drawing Sheets

(51) Int. Cl.
| | |
|---|---|
| G01J 3/02 | (2006.01) |
| G01J 3/50 | (2006.01) |
| G06T 1/00 | (2006.01) |
| H04N 1/00 | (2006.01) |
| B41F 33/00 | (2006.01) |
| B41F 33/02 | (2006.01) |
| B41F 33/16 | (2006.01) |
| G06T 7/73 | (2017.01) |
| G06T 7/90 | (2017.01) |

(52) U.S. Cl.
CPC ............ B41F 33/16 (2013.01); G01J 3/0202 (2013.01); G01J 3/50 (2013.01); G06T 1/00 (2013.01); G06T 7/74 (2017.01); G06T 7/90 (2017.01); H04N 1/00092 (2013.01); B41P 2233/11 (2013.01); G06K 9/00 (2013.01); G06T 2207/10024 (2013.01); G06T 2207/30144 (2013.01)

(58) Field of Classification Search
CPC ................ B41P 2233/11; B44D 3/003; G06T 2207/10008; G06T 2207/30141; G06T 2207/30144; G06T 7/001; G06T 7/0044; G06T 7/408; G06T 2207/10024; G06T 7/004; H04N 1/6033; H04N 1/00092; H04N 1/6027; H04N 1/00045; H04N 1/00323; H04N 1/034; H04N 1/60; H04N 2201/3242; H04N 1/00023; H04N 1/00034; H04N 2201/0472; H04N 2201/04749; H04N 2201/04786; H04N 2201/04732; H04N 2201/04734; H04N 1/04; H04N 1/486; G06K 9/6255; G06K 9/20; G06K 19/06037; G06K 7/1439; G06K 9/00; G01B 11/00; G01J 3/0202; G01J 3/46; G01J 3/52; G01J 3/06; G03B 27/735; G03B 37/02; G03G 15/5062; G03G 15/0173; G03G 15/01; G03G 2215/00067; G02B 21/367; B41J 2/2142; B41J 2/04563; B41J 2/155
USPC ........ 382/112, 144, 149; 358/500, 513, 512, 358/518, 523, 525, 1.9
See application file for complete search history.

(56) References Cited

U.S. PATENT DOCUMENTS

| | | | |
|---|---|---|---|
| 5,317,390 A | 5/1994 | Bolza-Schunemann et al. | |
| 6,304,671 B1* | 10/2001 | Kakutani | G06T 3/4007 358/523 |
| 6,865,288 B1* | 3/2005 | Shishido | G06T 7/001 382/141 |
| 2002/0162470 A1 | 11/2002 | Shimamura | |
| 2005/0094170 A1* | 5/2005 | Ichitani | H04N 1/6033 358/1.9 |
| 2006/0092442 A1 | 5/2006 | Such et al. | |
| 2009/0059323 A1* | 3/2009 | Ido | H04N 1/58 358/512 |
| 2009/0201521 A1* | 8/2009 | Ooya | G03G 15/0142 358/1.9 |
| 2009/0251715 A1* | 10/2009 | Kita | G03G 15/01 358/1.9 |
| 2011/0216120 A1 | 9/2011 | Friedman et al. | |
| 2013/0027721 A1* | 1/2013 | Kobayashi | H04N 1/6086 358/1.9 |
| 2013/0027759 A1* | 1/2013 | Nakamura | H04N 1/6055 358/505 |
| 2013/0250322 A1* | 9/2013 | Kawabata | H04N 1/60 358/1.9 |
| 2014/0125982 A1* | 5/2014 | Takemura | G03G 15/5062 356/421 |
| 2015/0132471 A1* | 5/2015 | Hibbs | B05D 1/305 427/8 |
| 2016/0027190 A1* | 1/2016 | Minagawa | G06T 5/001 382/167 |
| 2016/0042262 A1* | 2/2016 | Tanaka | G06K 7/1417 235/494 |

FOREIGN PATENT DOCUMENTS

| | | |
|---|---|---|
| CN | 101518980 A | 9/2009 |
| CN | 101077649 B | 5/2011 |
| DE | 3232490 A1 | 3/1983 |
| DE | 3932932 A1 | 4/1991 |
| DE | 102007020511 A1 | 11/2007 |
| EP | 1652668 A1 | 5/2006 |
| EP | 2505356 A1 | 10/2012 |
| EP | 2720015 A1 | 4/2014 |
| JP | H10-67099 A | 3/1998 |
| JP | 2000-251076 A | 9/2000 |
| JP | 2001-293847 A | 10/2001 |
| JP | 2001-307071 A | 11/2001 |
| JP | 2002-326343 A | 11/2002 |
| JP | 2004-354267 A | 12/2004 |
| JP | 2009-066807 A | 4/2009 |

OTHER PUBLICATIONS

Oct. 8, 2015 International Preliminary Report on Patentability issued in International Patent Application No. PCT/JP2014/057994.
May 20, 2014 International Search Report issued in International Patent Application No. PCT/JP2014/057994.

* cited by examiner a. Instruction-Exclusive Computer b. Measurement Apparatus
(for both Reference and Measurement)

Location A:
c. Measurement Apparatus
(Exclusive for Reference-Image)

Location B:
d. Measurement Apparatus
(Exclusive for Measurement-Image)

MEASURING APPARATUS, MEASUREMENT METHOD, INFORMATION PROCESSING APPARATUS, AND MEASUREMENT PROGRAM

TECHNICAL FIELD

The present invention relates to a measurement apparatus, a measurement method, an information processing apparatus, and a measurement program for measuring measurement values at the same position between a final contract proof and a printed matter, for example.

BACKGROUND ART

Conventionally, for example, in offset printing, a color adjustment has been made for a targeted final contract proof by use of a control strip generally arranged outside a sheet of a printed matter. With the color adjustment using a control strip, when color matching of images between the final contract proof and the printed matter is performed depending on the color adjustment based on visual sensory evaluation and experience of a printing operator, for example, an accurate color adjustment may be difficult.

Thus, the colors of color patches in the control strip are measured or pictures (images) are directly measured thereby to make a color adjustment, but in such a case, positioning for measuring the colors at the same position between the final contract proof and the printed matter may be difficult due to a dimensional size error therebetween.

Under the circumstances, there is known a printed matter check apparatus for measuring colors at the same position (see Patent Literature 1 described below, for example). The printed matter check apparatus is directed for reading an image in a predetermined area in a picture on a reference printed matter, and performing a pattern matching processing of the image in the predetermined area for a printed matter to be checked thereby to detect an offset of a picture print position on the printed matter to be checked relative to the reference printed matter. Then, a coordinate system of the picture print position on the printed matter to be checked is corrected depending on the detected offset, thereby measuring a color at a corresponding position in each printed matter.

PRIOR ART DOCUMENT

Patent Literature

Patent Literature 1: JP 10-67099 A

SUMMARY OF INVENTION

Problem to be Solved by the Invention

However, with the conventional printed matter check apparatus disclosed in the above-described Patent Literature 1, the pattern matching processing needs to be performed on a printed matter to be checked based on an image in a predetermined area in a picture on a reference printed matter. Therefore, there is a problem that an image sensor such as camera for reading an image is required. Consequently, its cost increases and a color measurement processing is complicated.

It is an object of the present invention to provide a measurement apparatus capable of eliminating the problem of the above-mentioned conventional technique and making a comparative evaluation of measurement values at the same position between a reference-image and a measurement-image in inexpensively-configurable and a series of simple processing, and to provide a measurement method, an information processing apparatus, and a measurement program.

Means for Solving the Problem

A measurement apparatus according to the present invention comprises a table capable of placing thereon a medium displaying a reference-image including a displayed reference origin or a measurement-image including a displayed measurement origin corresponding to the reference origin, a measurement instrument measuring an arbitrary measurement point in the medium placed on the table, a movement mechanism supporting the measurement instrument relative to the table so as to make the measurement instrument movable, a position detection means detecting a position of the measurement instrument in a coordinate system of the table, an input means inputting the measurement origin, a computation means calculating a position of a measurement point of the measurement-image in the coordinate system of the table based on the positions of the reference origin of the reference-image, a measurement point of the reference-image, and the measurement origin of the measurement-image input by the input means, and a control means comparing the calculated position of the measurement point of the measurement-image with the position of the measurement instrument detected by the position detection means, and controlling the measurement instrument to be positioned at the calculated measurement point of the measurement-image.

According to an embodiment of the present invention, the input means inputs the positions of the reference origin and the measurement point of the reference-image and a measurement value of the measurement point of the reference-image, and the computation means compares and evaluates the measurement value of the medium by the measurement instrument at the measurement point where the measurement instrument is positioned by the control means, and the measurement value of the measurement point of the reference-image input by the input means thereby to calculate comparative evaluation information.

According to another embodiment of the present invention, the input means inputs the positions of the reference origin and the measurement point by use of the position detection means by moving the measurement instrument to the positions of the reference origin and the measurement point of the reference-image by the movement mechanism, the measurement instrument measures the reference-image at the position of the measurement point, and the computation means compares and evaluates a measurement value of the measurement-image by the measurement instrument at the measurement point where the measurement instrument is positioned by the control means, and a measurement value of the measurement point of the reference-image by the measurement instrument thereby to calculate comparative evaluation information.

According to still another embodiment of the present invention, the control means comprises a drive means configured to move the measurement instrument to the calculated measurement point of the measurement-image.

According to still another embodiment of the present invention, the computation means comprises a reference coordinate calculation means calculating a reference coordinate value indicating a coordinate value of the input measurement point in a coordinate system of the reference-image based on reference image structure information configuring the reference-image, and a measurement coordinate calculation means comparing the reference origin and the measurement origin thereby to calculate coordinate correction information of a coordinate system of the measurement-image relative to the coordinate system of the reference-image based on measurement image structure information configuring the measurement-image, and correcting the position of the measurement origin based on the coordinate correction information thereby to correct the reference coordinate value and calculating a measurement coordinate value indicating a coordinate value of the measurement point in the coordinate system of the measurement-image corresponding to the measurement point of the reference-image, acquires the measurement values of the measurement points of the reference-image and the measurement-image based on the reference coordinate value and the measurement coordinate value, and compares and evaluates the measurement values of the corresponding measurement points of the reference-image and the measurement-image thereby to calculate comparative evaluation information, and moves the measurement instrument to the measurement point by the drive means based on at least one of the reference coordinate value and the measurement coordinate value for at least one of the reference-image and the measurement-image thereby to acquire the measurement value.

According to still another embodiment of the present invention, the coordinate correction information includes scale information of the measurement-image relative to the reference-image calculated based on the reference image structure information and the measurement image structure information.

According to still another embodiment of the present invention, there is further provided a storage means storing measurement information indicating a measurement result and a measurement history of a measurement value of the measurement point indicated by the reference coordinate value as reference data in association with the reference-image and the reference image structure information, and storing measurement information indicating a measurement result and a measurement history of a measurement value of the measurement point indicated by the measurement coordinate value as measurement data including the comparative evaluation information in association with the measurement-image and the measurement image structure information.

According to still another embodiment of the present invention, there is further provided a color adjustment means calculating color adjustment information used for a color adjustment of a printer for printing at least one of the reference-image and the measurement-image based on the comparative evaluation information.

According to still another embodiment of the present invention, the reference-image and the measurement-image each include at least one of a picture image and a control strip image, the measurement point is set on at least one of the picture image and the control strip image, and the measurement value includes color information at the measurement point on at least one of the picture image and the control strip image.

According to still another embodiment of the present invention, the reference-image and the measurement-image each include a picture image and a control strip image, the measurement point is set on the picture image and the control strip image, the measurement value includes color information at the measurement point on the picture image and the control strip image, and the computation means additionally acquires a measurement value of the control strip image of an ink key sequence of the printer indicating the same color information as the color information in the measurement value of the picture image acquired at the measurement point by moving the measurement instrument by the drive means for the reference-image and the measurement-image, and further compares and evaluates the color information in the measurement value of the picture image and the color information in the measurement value of the control strip image.

According to still another embodiment of the present invention, the computation means compares a color difference at each of the measurement points as a CMYK ink correction amount based on the values obtained by converting the measurement values of the reference-image and the measurement-image into a halftone dot percent by use of a color conversion table, or the measured density values, and plots all the measurement results of the picture image and the control strip image on a graph indicating increase/decrease relationships of a measurement value of the measurement-image relative to a measurement value of the reference-image, thereby further calculating color evaluation information indicating an entire color gradation reproduction state of the picture image.

According to still another embodiment of the present invention, the computation means further compares and evaluates an additionally-acquired measurement value of a preset color, and a measurement value of at least one of the reference-image and the measurement-image.

According to still another embodiment of the present invention, for receiving at least information on the reference origin and the measurement point out of the information on the reference origin and the measurement point of the reference-image and information on the measurement value of the measurement point via a network.

According to still another embodiment of the present invention, for measuring a measurement value of the measurement point of the reference-image based on the information on the reference origin and the measurement point of the reference-image received via the network, and transmitting the reference origin and the measurement point of the reference-image and the measured measurement value of the measurement point via the network.

An information processing apparatus according to the present invention transmits at least information on the reference origin and the measurement point out of the information on the reference origin and the measurement point of the reference-image and information on the measurement value of the measurement point to the above-mentioned measurement apparatus via a network.

A measurement method according to the present invention comprises inputting a reference origin of a reference-image by an input means, designating a measurement point of the reference-image by the input means, calculating a reference coordinate value indicating the measurement point based on reference image structure information configuring the reference-image, acquiring a measurement value of the measurement point of the reference-image based on the reference coordinate value, inputting a measurement origin of a measurement-image to be compared and evaluated with the reference-image by the input means, comparing the reference origin and the measurement origin thereby to calculate coordinate correction information on a coordinate system of the measurement-image relative to a coordinate system of the reference-image based on measurement image structure information configuring the measurement-image, correcting the position of the measurement origin based on the coordinate correction information thereby to correct the reference coordinate value and calculating a measurement coordinate value indicating a coordinate value of the measurement point in the coordinate system of the measurement-image corresponding to the measurement point of the reference-image, acquiring a measurement value of the measurement point of the measurement-image based on the measurement coordinate value, and comparing and evaluating the measurement values of the corresponding measurement points of the reference-image and the measurement-image thereby to calculate comparative evaluation information, wherein a measurement instrument is moved to the measurement point for at least one of the reference-image and the measurement-image thereby to acquire the measurement value in the measurement value acquisition step.

A measurement program according to the present invention uses a measurement apparatus comprising a measurement instrument for detecting a measurement value of an arbitrary measurement point in at least one of a reference-image and a measurement-image to be compared and evaluated with the reference-image, a drive means configured to move the measurement instrument to the measurement point, an input means for inputting a reference origin and the measurement point of the reference-image and a measurement origin of the measurement-image, a reference coordinate calculation means for calculating a reference coordinate value indicating a coordinate value of the input measurement point in a coordinate system of the reference-image based on reference image structure information configuring the reference-image, a measurement coordinate calculation means for comparing the reference origin and the measurement origin thereby to calculate coordinate correction information on a coordinate system of the measurement-image relative to the coordinate system of the reference-image based on measurement image structure information configuring the measurement-image, and correcting the position of the measurement origin based on the coordinate correction information thereby to correct the reference coordinate value, and calculating a measurement coordinate value indicating a coordinate value of the measurement point in the coordinate system of the measurement-image corresponding to the measurement point of the reference-image, and a computation means for acquiring the measurement values of the measurement points of the reference-image and the measurement-image based on the reference coordinate value and the measurement coordinate value, and comparing and evaluating the measurement values of the corresponding measurement points of the reference-image and the measurement-image thereby to calculate comparative evaluation information, the measurement program for causing a computer to perform inputting the reference origin and the measurement point, calculating the reference coordinate value, acquiring a measurement value of the measurement point of the reference-image, inputting the measurement origin, calculating the coordinate correction information, calculating the measurement coordinate value, acquiring a measurement value of the measurement point of the measurement-image, and calculating the comparative evaluation information, wherein the measurement instrument is moved to the measurement point by the drive means based on at least one of the reference coordinate value and the measurement coordinate value for at least one of the reference-image and the measurement-image thereby to detect the measurement value in the measurement value acquisition step.

Effects of Invention

According to the present invention, it is possible to make a comparative evaluation of measurement values at the same position between a reference-image and a measurement-image in inexpensively-configurable and a series of simple processing.

EMBODIMENTS FOR CARRYING OUT THE INVENTION

A measurement apparatus, a measurement method, an information processing apparatus, and a measurement program according to embodiments of the present invention will be described below in detail with reference to the accompanying drawings.

Figure 1:
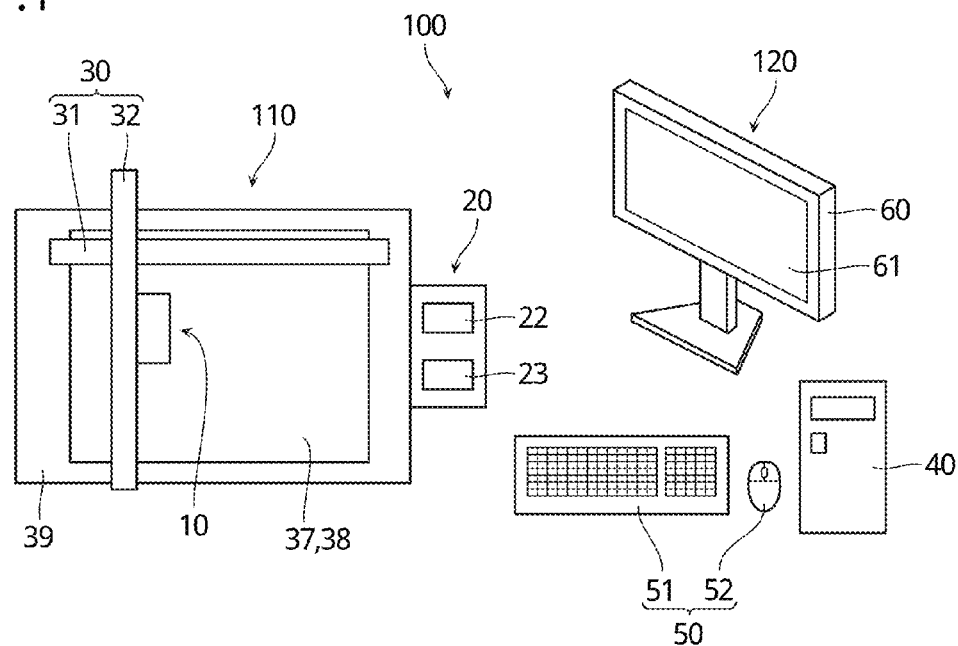
FIG. 1 is a diagram illustrating an entire structure of a measurement apparatus according to one embodiment of the present invention.
Figure 2:
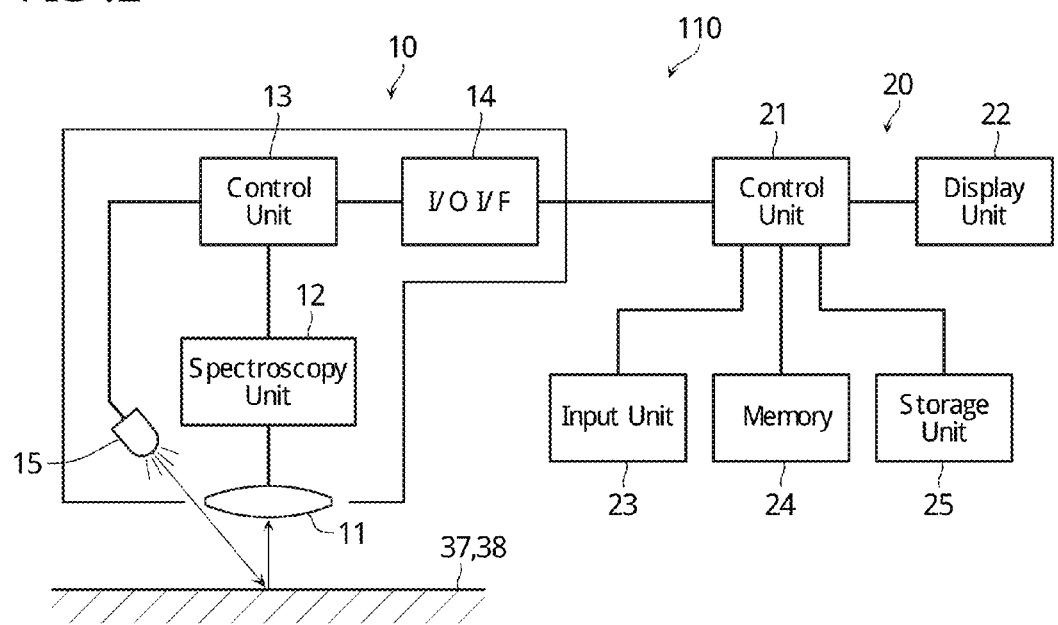
FIG. 2 is a diagram illustrating a functional structure of same measurement apparatus.
Figure 3:
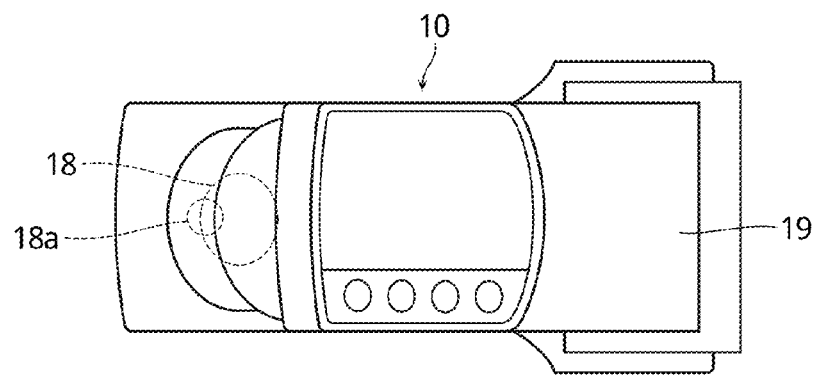
FIG. 3 is a plan view of a measurement instrument in same measurement apparatus.
Figure 4:
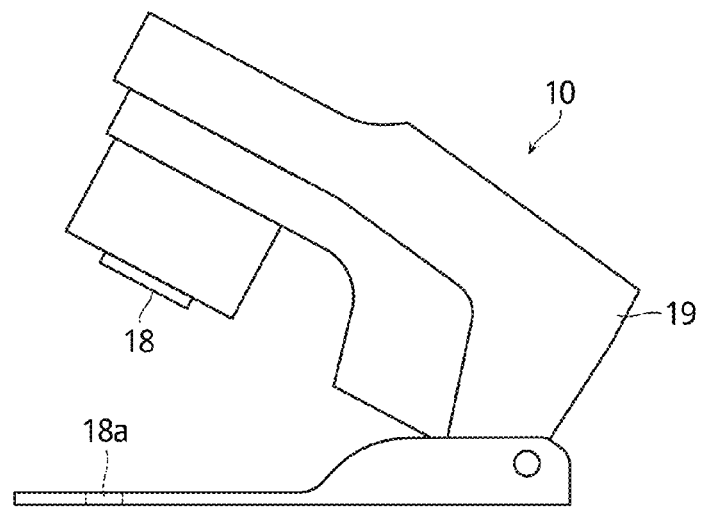
FIG. 4 is a side view of the measurement instrument in same measurement apparatus.
Figure 5:
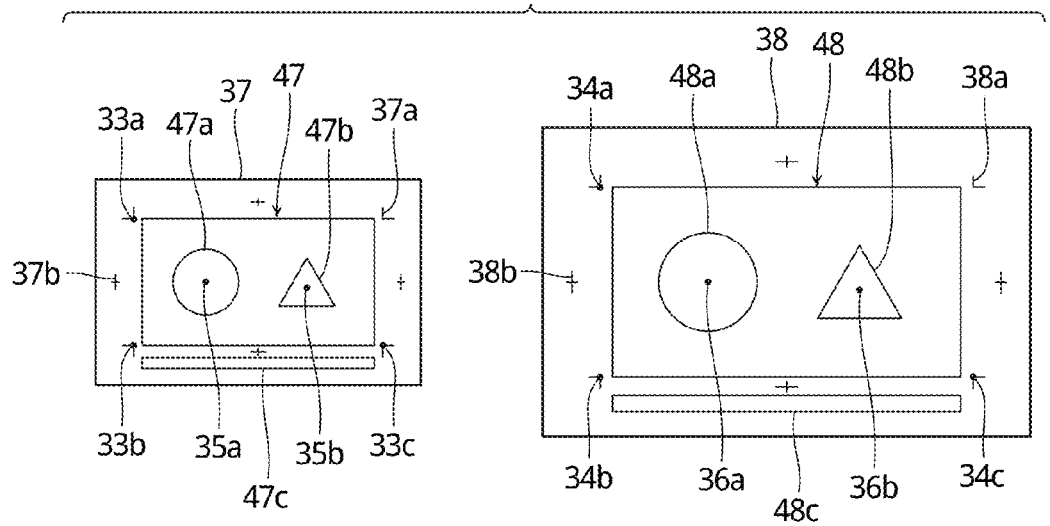
FIG. 5 is a diagram for explaining reference points and measurement origins of a final contract proof and a printed matter and explaining a plurality of measurement points thereof in same measurement apparatus.

FIG. 1 is a diagram illustrating an entire structure of a measurement apparatus according to one embodiment of the present invention. FIG. 2 is a diagram illustrating a functional structure of the measurement apparatus. FIG. 3 and FIG. 4 are a plan view and a side view of a measurement instrument in the measurement apparatus, respectively. FIG. 5 is a diagram for explaining reference points and measurement origins of a final contract proof and a printed matter and explaining a plurality of measurement points thereof in the measurement apparatus.

Figure 6:
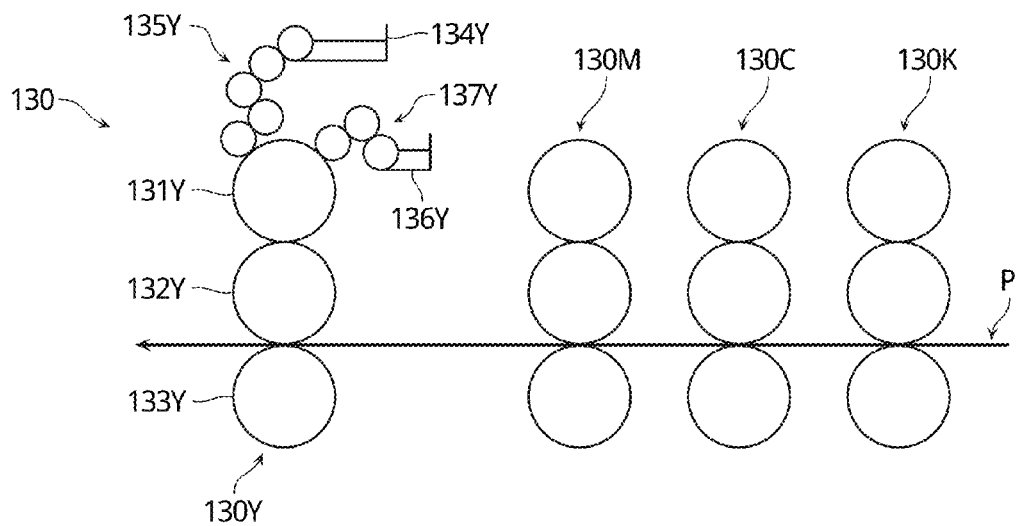
FIG. 6 is a schematic diagram illustrating a basic structure of a printer capable of adjusting the ink supply amount to which same measurement apparatus is applied.
Figure 7:
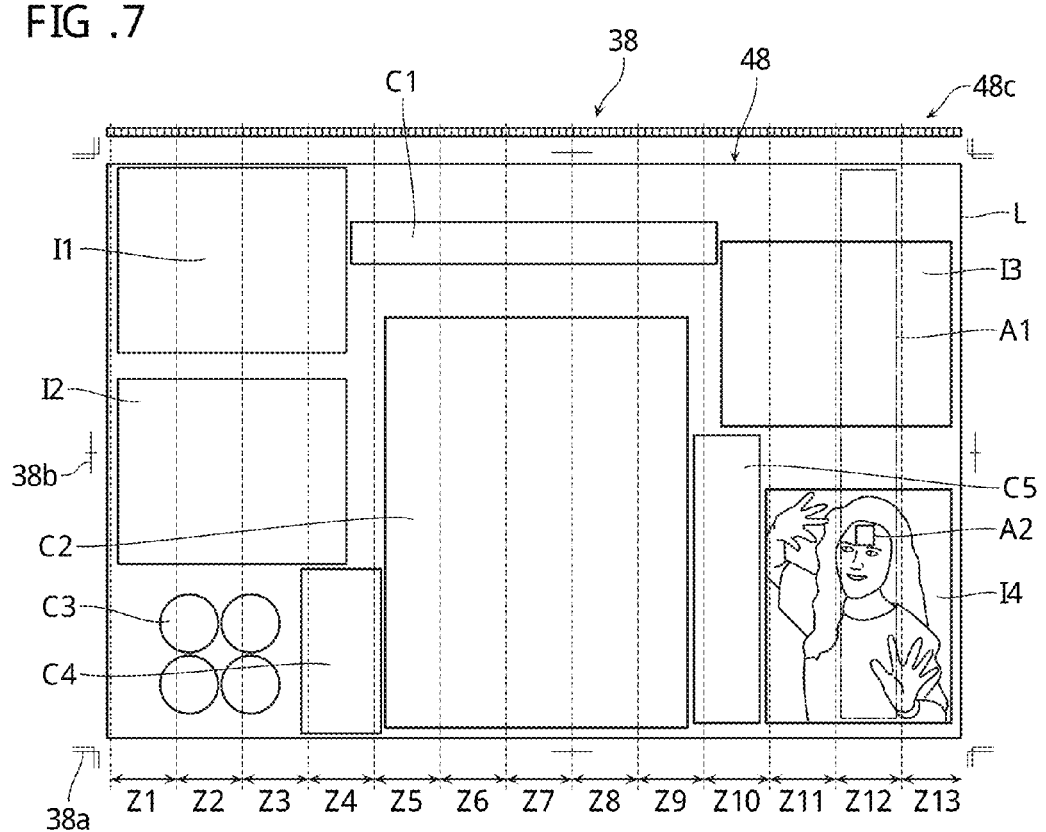
FIG. 7 is a diagram illustrating a printed matter on which a color adjustment is made by the printer.
Figure 8:
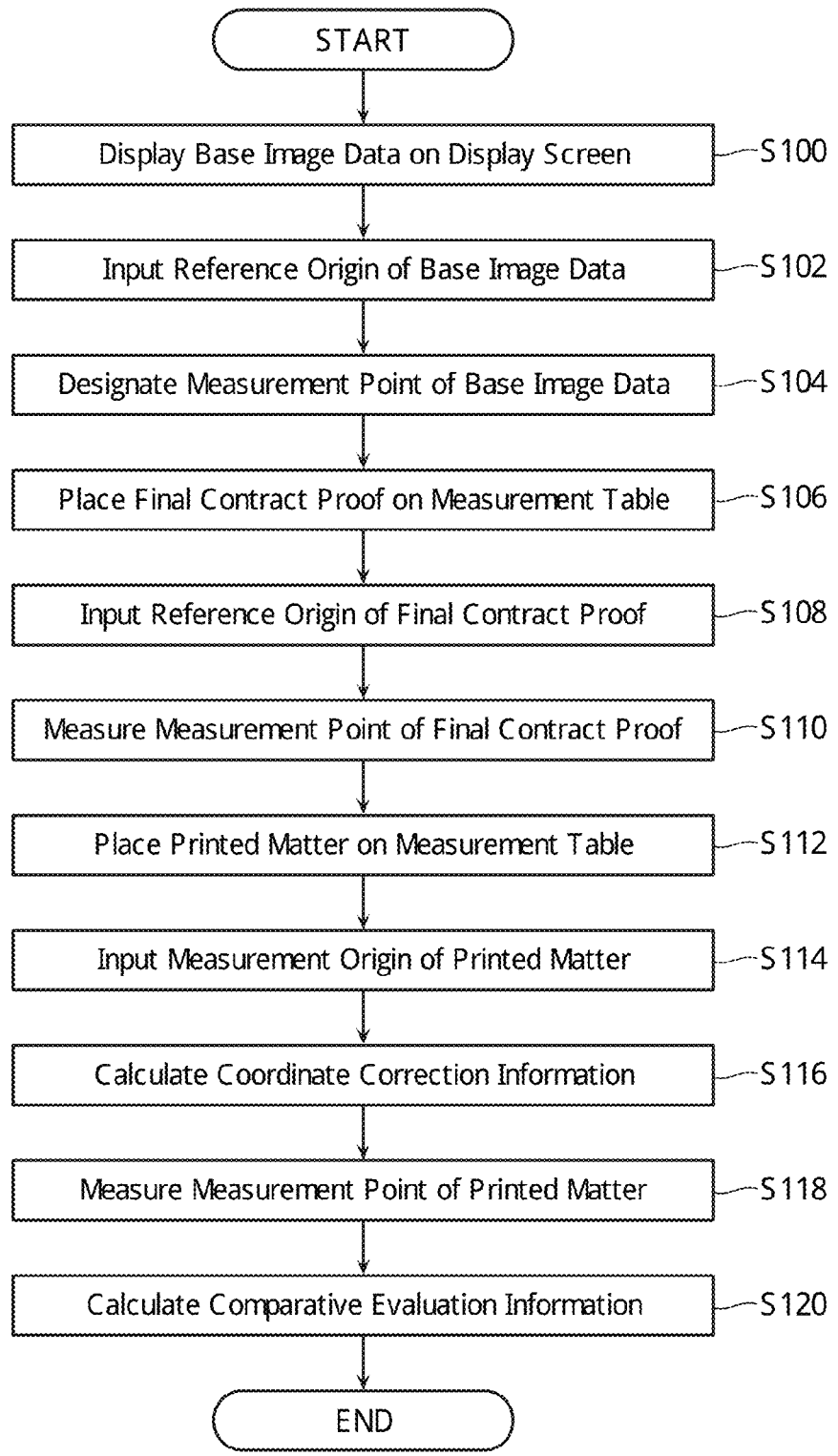
FIG. 8 is a flowchart illustrating a measurement processing procedure of same measurement apparatus.

Further, FIG. 6 is a schematic diagram illustrating a basic structure of a printer capable of adjusting the ink supply amount to which the measurement apparatus according to one embodiment of the present invention is applied. FIG. 7 is a diagram illustrating a printed matter on which a color adjustment is made by the printer. FIG. 8 is a flowchart illustrating a measurement processing procedure by the measurement apparatus.

According to the present embodiment, there is assumed, by way of example, that the present invention is applied to an optical measurement apparatus used for measuring colors (color measurement) between a final contract proof and a printed matter in offset printing or the like, for example. Herein, a reference-image is an entire image of the final contract proof and a measurement-image is an entire image of the printed matter to be compared and evaluated with the final contract proof. The reference-image may be base image data of the final contract proof.

As illustrated in FIG. 1 and FIG. 2, a measurement apparatus 100 includes an XY table device 110 and a computer 120. The XY table device 110 includes a measurement instrument 10, a controller 20, a drive unit 30 for driving the measurement instrument 10 by a drive motor (not illustrated) together with an X axis support member 31 and a Y axis support member 32, and a measurement table 39 with a planar placement board, for example.

The computer 120 includes a computer main body 40 including known components such as CPU, RAM, ROM and HDD, an input device 50 including a keyboard 51, a mouse 52, a digitizer (not illustrated) or the like, and a display device 60 configured of a liquid crystal display, organic EL display or the like. Note that a final contract proof 37 or a printed matter 38 printed based on the final contract proof 37 is placed at a basic measurement position on the placement board on the measurement table 39 in the XY table device 110.

The X axis support member 31 and the Y axis support member 32 configuring the drive unit 30 in the XY table device 110 are attached on the measurement table 39, for example. The measurement instrument 10 is attached movably in the Y axis direction and the Z axis direction relative to the Y axis support member 32. The Y axis support member 32 is attached movably in the X axis direction relative to the X axis support member 31. Therefore, the measurement instrument 10 is configured to be movable in the three axis directions of the X, Y, and Z axes by the drive unit 30 on the measurement table 39.

The measurement instrument 10 includes a lens unit 11, a spectroscopy unit 12, a control unit 13, an I/O interface (I/F) 14, and a light source 15 such as LED, for example. The controller 20 includes a control unit 21 such as CPU, a display unit 22 such as liquid crystal display, an input unit 23 such as numeric keypad, touch pen, touch panel, or digitizer, a memory 24 such as RAM or ROM, and a storage unit 25 such as HDD.

The measurement instrument 10 may be configured of, for example, a spot measurement instrument having a known spectrophotometer function in which an aperture diameter of a measurement aperture unit 18 (see FIG. 3 or the like) described below is less than about 50 mm. That is, in the measurement instrument 10, a light irradiated from the light source 15 to a measurement point on the final contract proof 37 or the printed matter 38 is input into the spectroscopy unit 12 via the lens unit 11. The spectroscopy unit 12 measures colors (color measurement) at a plurality of arbitrary measurement points.

A measurement value including color information dispersed in the spectroscopy unit 12 and found in the control unit 13 is transmitted to the control unit 21 in the controller 20 via the I/O I/F 14. The color information includes at least one of a spectral value, an L*a*b* value, an RGB value, a CMYK value, an XYZ value, a density value, a Munsell display value, an infrared wavelength, an ultraviolet wavelength, and an X-ray wavelength as measurement values of image data, printed matter, a light emitting surface, or an object, for example. The measurement values are stored in the memory 24 or the storage unit 25 in association with additional information such as image structure information including image data on a reference-image on the final contract proof 37 or a measurement-image on the printed matter 38 input into the control unit 21 via the input unit 23, job name configuring the same, resolution, quantity of pixels, image size information, sheet size information, and comparison condition, and measurement information indicating job name, coordinate value or measurement result of each measurement point, and measurement history.

The position of each measurement point on the final contract proof 37 or the printed matter 38 is captured by a measurement mark 18a provided on a measurement instrument main body 19 including the casing of the measurement instrument 10 as illustrated in FIG. 3 and FIG. 4, and is input as a coordinate value into the input unit 23 in the controller 20. Also, the measurement value of each measurement point is acquired by the measurement aperture unit 18. Information such as measurement value from each measurement point is displayed on a display screen (not illustrated) of the display unit 22 or a display screen 61 of the display 60 in the computer 120 as needed.

Note that when the measurement apparatus 100 is configured of only the XY table device 110 without including the computer 120, there may be configured such that the control unit 21 in the controller 20 has the function of the computer main body 40 in the computer 120, the input unit 23 has the function of the input device 50, and the display unit 22 has the function of the display 60.

With thus-configured measurement apparatus 100, as illustrated in FIG. 5, the measurement values at a plurality of measurement points 35a and 35b on a reference-image 47 printed on the final contract proof 37 and the measurement values at a plurality of measurement points 36a and 36b on a measurement-image 48 printed on the printed matter 38 are compared and evaluated by a simple operation, for example.

That is, the measurement apparatus 100 is configured such that when the measurement point 35a, 35b on the reference-image 47 is designated by the mouse 52 or the like to acquire its measurement value, the measurement instrument 10 is moved to each measurement point 36a, 36b on the measurement-image 48 corresponding to each measurement point 35a, 35b by the drive unit 30 thereby to automatically acquire its measurement value, and when color information is acquired as each measurement value, a comparative evaluation is enabled by color difference (ΔE) data or the like based on the color information by color matching, for example.

There is configured such that by use of the comparative evaluation information acquired by the comparative evaluation, a color adjustment or the like can be easily made in which a color of the measurement-image 48 on the printed matter 38 as a test printed sheet which is printed in advance by the printer capable of adjusting the ink supply amount, for example, is made closer to a color of the reference-image 47 on the final contract proof 37 as a reference printed matter or a color of PPF data or TIFF data including the base image data of the reference-image 47.

In FIG. 5, the final contract proof 37 and the printed matter 38 are made of different dimension (size) sheets, for example. The final contract proof 37 expresses thereon the reference-image 47 including picture images 47a and 47b formed on a sheet by inks in offset printing, for example, and a control strip image 47c including a color material solid portion.

In contrast, the printed matter 38 expresses thereon the measurement-image 48 to be compared and evaluated with the reference-image 47 on the final contract proof 37. The measurement-image 48 includes picture images 48a and 48b formed on a sheet by inks in offset printing similarly to the reference-image 47, and a control strip image 48c including a color material solid portion. That is, the reference-image 47 and the measurement-image 48 include the picture images 47a, 47b, 48a, and 48b, and the control strip images 47c and 48c with substantially the same structure though different dimensions.

In the final contract proof 37, a reference origin 33a as the origin of the reference-image 47 is set at the cross point of a cutting mark 37a, for example. The reference origin 33a is set by designating the base image data of the reference-image 47 displayed on the display screen 61 of the display 60 by the mouse 52 in the input device 50 or the like, for example. Additionally, in the final contract proof 37, reference points 33b and 33c for acquiring angle bending information indicating a tilt of the reference-image 47 as needed are set at the cross points of other cutting marks 37a similarly to the above in addition to the reference origin 33a.

In contrast, in the printed matter 38, a measurement origin 34a as the origin of the measurement-image 48 is set at the cross point of a cutting mark 38a, for example. The measurement origin 34a is designated by the mouse 52 or the like to be set similarly to the reference origin 33a. Additionally, in the printed matter 38, reference points 34b and 34c for acquiring angle bending information indicating a tilt of the measurement-image 48 as needed are similarly set at the cross points of other cutting marks 38a in addition to the measurement origin 34a.

Note that the reference origin 33a and the measurement origin 34a may be set at the cross points of so-called cutting marks as finished dimension references in consideration of the different sheet dimensions of the final contract proof 37 and the printed matter 38. Moreover, when the reference-image 47 or the measurement-image 48 includes a trimming frame or characteristic point facilitating operator's visual determination, the reference origin 33a and the measurement origin 34a may be set at the positions thereof. Also, so-called center register marks 37b and 38b may be employed instead of the cutting marks 37a and 38a.

Moreover, when the final contract proof 37 and the printed matter 38 are accurately set at the basic setting position on the measurement table 39 in the XY table device 110, the reference points 33b, 33c, 34b, and 34c may not be set assuming that angle bending is not caused. If the reference points are set, a positional consistency between the final contract proof 37 or printed matter 38 and the digital data such as the base image data or the like can be kept more accurately.

As illustrated in FIG. 6, a printer 130 capable of printing the final contract proof 37 and the printed matter 38 includes a black (Key Plate: K) printing unit 130K, a cyan (C) printing unit 130C, a magenta (M) printing unit 130M, and a yellow (Y) printing unit 130Y through which a printing sheet P on which the reference-image 47 or the measurement-image 48 is printed sequentially passes in the direction of an arrow in FIG. 6.

The printing units 130K, 130C, 130M, and 130Y of each color in the printer 130 have substantially the same structure. Therefore, the yellow printing unit 130Y will be described below as a representative example and the printed matter 38 will be described as an example printed by the printer 130, but the final contract proof 37 has the same structure.

The yellow printing unit 130Y includes a plate cylinder 131Y, a blanket cylinder 132Y, an impression cylinder 133Y, an ink bottle 134Y, an ink roller 135Y, a dampening water device 136Y, and a dampening water roller 137Y. The plate cylinder 131Y is configured by winding an aluminum-made plate on the surface of the drum, for example.

The blanket cylinder 132Y is an intermediate cylinder in which a rubber blanket is wound on the surface of the drum. An ink is transported from the plate cylinder 131Y to the blanket cylinder 132Y. Accordingly, the blanket cylinder 132Y transports the ink onto a printing sheet P again. The impression cylinder 133Y is provided opposite to the printing sheet P relative to the blanket cylinder 132Y.

The ink bottle 134Y is a container in which an ink to be used for printing is saved. The ink roller 135Y transports the ink supplied from the ink bottle 134Y to a printing element of the plate cylinder 131Y. The ink roller 135Y is configured by combining a plurality of rollers. The ink roller 135Y can adjust the ink supply amount by changing an interval between the roller closest to the ink bottle 134Y and the ink bottle 134Y.

The dampening water device 136Y is a container storing dampening water which forms a water film on a non-printing element of the plate cylinder 131Y to prevent the attachment of ink. The dampening water roller 137Y includes a plurality of rollers which supply the dampening water from the dampening water device 136Y to the plate cylinder 131Y. The printer 130 is configured as described above.

In contrast, as illustrated in FIG. 7, the printed matter 38 printed by the printer 130 has ink bottle areas Z1 to Z13 in which the ink supply amount can be independently adjusted, for example. The ink supply amount can be arbitrarily increased or decreased per color such as CMYK or the like in each of the ink bottle areas Z1 to Z13.

The printed matter 38 has the measurement-image 48 including images I1, I2, I3, I4 and color charts C1, C2, C3, C4, C5 printed within a cutting line L inside a region surrounded by the cutting marks 38a, for example. The images I1 to I4 are the picture images 48a and 48b such as photographs or illustrations or the like, which include a halftone portion or a gradation portion in which a color continuously changes in addition to the solid portion.

The printed matter 38 has the control strip image 48c as a type of color chart printed beyond the cutting line L outside the region surrounded by the cutting marks 38a. The control strip image 48c is provided with a solid portion for each CMYK color for each of the ink bottle areas Z1 to Z13, and a middle tone portion made of 25%, 50%, or 75% halftone dots, for example. Since the control strip image 48c includes the middle tone portion of 50% or 25% or the like, for example, not only the solid portion, so that the correlation between the temperature of ink, water, and a dot gain can be considered and more preferable color reproduction is enabled.

Though not illustrated, a white or black slit portion may be provided at a boundary of each color in the solid portion or the halftone portion in the control strip image 48c. Such a slit portion is provided so that when the measurement instrument 10 is continuously moved to measure the control strip image 48c, a positional error does not occur at a measurement point on the control strip image 48c.

The printed matter 38 with the structure is compared and evaluated with the final contract proof 37 as described above, for example. In the measurement apparatus 100, the measurement point 36a, 36b in the measurement-image 48 on the printed matter 38, which is at the same position as the designated measurement point 35a, 35b, is automatically set according to the measurement point 35a, 35b arbitrarily selected and designated in the reference-image 47 on the final contract proof 37, for example. That is, the measurement points at the same position in both images can be easily acquired even if the sheets or images are in different sizes.

For example, in the printed matter 38, the measurement instrument 10 is automatically moved to the automatically-set measurement point 36a, 36b by the drive unit 30 so that the image at the measurement point 36a, 36b is measured. The measurement may be made by spot color measurement by the measurement aperture unit 18, or may be made by surface color measurement by surface-measuring a color of the measurement point 35a or the like and comparing corresponding pixels or groups of pixels at each measurement point 35a or the like thereby to calculate an average color difference ΔE in a predetermined range. The measurement processing procedure in the measurement apparatus 100 is specifically as follows, for example.

The following series of processing includes human-operated steps for convenient description. The base image data of the reference-image 47 on the final contract proof 37, the reference-image 47 on the final contract proof 37, and the measurement-image 48 on the printed matter 38 will be referred to in the following series of processing, but the actual measurement is made in comparison between two objects, such as comparison between the base image data and the final contract proof, comparison between the base image data and the printed matter, or comparison between the final contract proof and the printed matter.

As illustrated in FIG. 8, at first, job information of print order receipt information for measurement (including client name, print name, size, print quantity, appointed date of delivery, and print image/color management information) is input into the computer main body 40 in the computer 120 via the input device 50 or a network (not illustrated). Thereby, the reference data including the base image data (such as PPF, Tiff, or PDF) of the reference-image 47 on the final contract proof 37 to be measured is read from the data file in the HDD or the like in the computer main body 40 or a database in other server storing the same, and the base image data is displayed on the display screen 61 of the display 60 (step S100). Then, the reference origin 33a of the displayed base image data is designated and input by use of the mouse 52 of the input device 50 or the like (step S102). These steps S100 and S102 are a phase of setting an origin on the display screen 61 in the computer 120.

The base image data is base data printed by the printer 130, such as the PPF data or four-color printing data in which each layout-imposed plate is made of one bit. The base image data includes structure information such as resolution or quantity of pixels of the reference-image 47 on the final contract proof 37.

Moreover, the reference data includes structure information such as sheet size information configuring the final contract proof 37 together with the base image data, for example. The operator operates the mouse 52 or the like to designate the cross point of a cutting mark 37a of the data while viewing the base image data displayed on the display screen 61 so that the reference origin 33a is input. Thereby, the reference origin 33a of the base image data is registered at a position indicated by the coordinate value of the cross point of the cutting mark 37a of the base image data configuring the final contract proof 37.

After the reference origin 33a is input, the operator designates a position to be measured on the base image data by the mouse 52 or the like while viewing the base image data displayed on the display screen 61, thereby designating and inputting the measurement point 35a, 35b on the base image data (step S104). In the computer main body 40, a coordinate system of the base image data is generated based on the positional information on the registered reference origin 33a and the structure information, and the XY coordinate value of the measurement point 35a, 35b, which is input for the base image data indicating the coordinate value in the coordinate system, is calculated as a reference measurement coordinate value. At this time, though not illustrated, a measurement point on not only the picture images but also the control strip image may be designated and input as needed.

Further, in the computer main body 40, there is generated a measurement instruction command including the calculated XY coordinate value (reference measurement coordinate value) of the measurement point 35a, 35b and directed for moving the measurement instrument 10 in the XY table device 110 to a measurement point in the X, Y and Z directions by the drive unit 30 and causing the control unit 13 to make a measurement. At this time, the calculated XY coordinate value of the measurement point 35a, 35b may be displayed on the display screen 61.

Further, there may be configured such that when the sheet sizes of the final contract proof 37 and the printed matter 38 are different, coordinate correction information including scale information on the measurement-image 48 relative to the reference-image 47 is calculated based on the structure information such as sheet size information and a coordinate correction computation is made by use of the coordinate correction information so that the XY coordinate value of the position-corrected measurement point 35a, 35b is included in the measurement instruction command. Step S104 is a phase of setting a measurement point on the display screen 61 in the computer 120.

Then, in the XY table device 110, the final contract proof 37 is placed at the basic setting position in order not to cause angle bending on the measurement table 39 (step S106). Then, the operator operates the input unit 23 in the controller 20, for example, to designate the cross point of a cutting mark 37a for the final contract proof 37 on the measurement table 39 so that the reference origin 33a of the final contract proof 37 is designated and input (step S108). These steps S106 and S108 are a phase of setting an origin of the final contract proof 37 on the measurement table 39 in the XY table device 110. Thereby, the reference origin 33a of the final contract proof 37 is registered at a position indicated by the coordinate value of the cross point of the cutting mark 37a of the final contract proof 37.

When the reference origin 33a of the final contract proof 37 is input, the control unit 21 in the controller 20 generates a coordinate system of the final contract proof 37, and adjusts the coordinate position of the reference origin 33a of the final contract proof 37 based on the reference origin 33a of the base image data in response to the measurement instruction command received from the computer 120. Then, the drive unit 30 is controlled based on the XY coordinate value of the measurement point 35a, 35b included in the measurement instruction command to automatically move the measurement instrument 10 to the measurement point 35a, 35b, thereby making a measurement at each measurement point 35a, 35b (step S110).

Note that the measurement by the XY table device 110 may be made in real-time at the same time with designation of the measurement point 35a, 35b of the base image data in the computer 120 in step S104, or may be made for the final contract proof 37 after a certain period of time elapses, for example. That is, the measurement apparatus 100 can make so-called real-time measurement and time lag measurement.

When measuring the final contract proof 37 is finished, the control unit 21 in the controller 20 stores the measurement information indicating a measurement result or measurement history (such as measurement date or measurement time) of a calorimetric value (such as color information including L*a*b* value or density value) as a measurement value of the measurement point 35a, 35b indicated by the XY coordinate value in the memory 24 or the storage unit 25 in association with the reference data, for example. Step S110 is a phase of measuring the final contract proof 37 in the XY table device 110.

Then, the final contract proof 37 is removed from the measurement table 39 and the printed matter 38 is placed at the basic setting position on the measurement table 39 without angle bending (step S112). Then, the operator operates the input unit 23, for example, to designate the cross point of a cutting mark 38a for the printed matter 38 on the measurement table 39, thereby inputting the measurement origin 34a of the printed matter 38 (step S114). The measurement origin 34a is registered at a position indicated by the coordinate value of the cross point of the cutting mark 38a of the printed matter 38.

When the measurement origin 34a is designated, the control unit 21 in the controller 20 generates a coordinate system of the printed matter 38, and compares the positions of the reference origin 33a and the measurement origin 34a, thereby detecting a dimensional error therebetween. When a dimensional error is present, coordinate correction information for correcting the XY coordinate value of the measurement point 35a, 35b based on the dimensional error in a predetermined unit (such as in a unit of 0.01%) is calculated (step S116). Herein, the calculated coordinate correction information is used for correcting the XY coordinate value in measuring the printed matter 38. These steps S112, S114, and S116 are a phase of measuring and setting the printed matter 38 in the XY table device 110.

Further, when calculating the coordinate correction information on the coordinate system of the printed matter 38 relative to the coordinate system of the base image data (or the coordinate system of the final contract proof 37), the control unit 21 in the controller 20 calculates the scale information on the printed matter 38 relative to the final contract proof 37 (that is, the measurement-image 48 relative to the reference-image 47) based on the sheet size information included in the structure information on the final contract proof 37 included in the reference data or the sheet size information included in the structure information on the printed matter 38, for example. Then, the position of the measurement origin 34a is corrected to the position of the reference origin 33a based on the coordinate correction information including the scale information, and for example, the scale information is reflected on the XY coordinate value indicating the measurement point 35a, 35b thereby to calculate the XY coordinate value of the measurement point 36a, 36b indicating the coordinate value in the coordinate system of the printed matter 38 corresponding to the measurement point 35a, 35b.

After the XY coordinate value of the measurement point 36a, 36b on the printed matter 38 is calculated, the drive unit 30 is controlled to automatically move the measurement instrument 10 to the measurement point 36a, 36b on the printed matter 38, thereby making a measurement at each measurement point 36a, 36b (step S118). When measuring the printed matter 38 is finished, the control unit 21 in the controller 20 stores the measurement information indicating a measurement result or measurement history of a measurement value of the measurement point 36a, 36b indicated by the XY coordinate value in the memory 24 or the storage unit 25 in association with the structure information on the printed matter 38, for example. Step S118 is a phase of measuring the printed matter 38 in the XY table device 110.

When the measurement value of the measurement point 35a, 35b on the final contract proof 37 and the measurement value (colorimetric measurement value) of the measurement point 36a, 36b on the printed matter 38 at the same position as the measurement point 35a, 35b are acquired, the control unit 21 in the controller 20 or the computer main body 40 in the computer 120 compares and evaluates the measurement values (colorimetric measurement values) at each measurement point thereby to calculate comparative evaluation information (step S120), and terminates the series of measurement processing in the flowchart.

Note that the color adjustment processing may be performed by the printer 130 as described below by use of the calculated comparative evaluation information. Thereafter, the control strip image 48c on the printed matter 38 may be measured, for example. When the control strip image 48c is measured, the quantity of ink keys and their numbers of the printer 130 are previously registered in the PC 20 or the computer main body 40 thereby to make a measurement in cooperation between the position numbers of the ink keys (ink key sequence) and the positions of the color patches of the control strip image 48C. In this case, irrespective of the performance of the measurement instrument 10, all the color patches of the control strip image 48c may be continuously measured while continuously moving the measurement instrument 10 at a constant speed along the X axis support member 31, for example.

The comparative evaluation information is calculated by comparing and evaluating the measurement values of the measurement point 35a and the measurement point 36a which are at the same position between the final contract proof 37 and the printed matter 38, and comparing and evaluating the measurement values of the measurement point 35b and the measurement point 36b as described above. The comparative evaluation information is stored as measurement data together with the measurement information and the structure information on the printed matter 38 in the memory 24 or the storage unit 25.

The comparative evaluation of each measurement point 35a, 35b, 36a, 36b is made by comparing the color at each measurement point with a L*a*b* value, a density value, or a Munsell color value output from the measurement instrument 10, for example, or by evaluating a differential of the color by the color difference ΔE, the CIEDE2000, or the like.

The measurement instrument 10 is assumed to be automatically moved to the measurement point 35a, 35b, 36a, 36b by the drive unit 30 in the series of measurement processing in steps S110 and S118, but the measurement instrument 10 may be configured to be manually moved. In such a case, the XY coordinate value may be displayed on the display unit 22 or the display screen 61 to enable a degree of positional matching to be visibly confirmed for the X coordinate and the Y coordinate, respectively, according to a matching accuracy.

That is, for example, a color of displayed characters of the XY coordinate value is red at a completely inconsistent position, and is yellow at a positional error of 1 mm or less. Further, it is blue at a positional error of 0.3 mm or less, and is green at a positional error of 0.1 mm or less. The XY coordinate value is displayed in this way so that the positional matching at each measurement point can be easily performed manually.

A slight size difference of about 0.1% to several % may be caused between the final contract proof 37 and the printed matter 38 due to an environmental change on printing even if the sizes of the sheets or the sizes of the reference-image 47 and the measurement-image 48 are the same. Therefore, when the measurement point 36a, 36b is measured on the printed matter 38, the measurement apparatus 100 calculates the XY coordinate value of the measurement point 36a, 36b by correcting the size to be independently changeable in the X and Y axes by use of the coordinate correction information, the scale information, or the angle bending information such that the measurement can be made at the same position even if the sizes are different.

Thereby, the size can be corrected in the X and Y axes independently when a measurement is made at the same position on the final contract proof 37 and printed matter 38 printed by use of the base image data in which the density of the picture images are the same or substantially the same. Therefore, the measurement can be made at the same position even in an image in which positional matching is difficult because a target objet cannot be found due to a mismatched angle of view in the image acquired by a shooting means such as camera, such as relatively large picture images including posters, or entirely gradational (ombre) picture images.

Figure 9A:
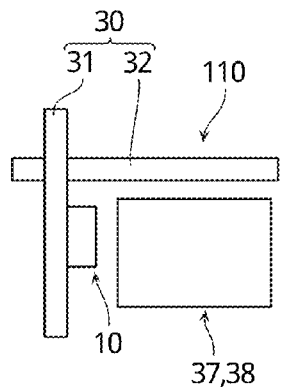
FIGS. 9A and 9B are diagrams illustrating variants of same measurement apparatus.
Figure 9B:
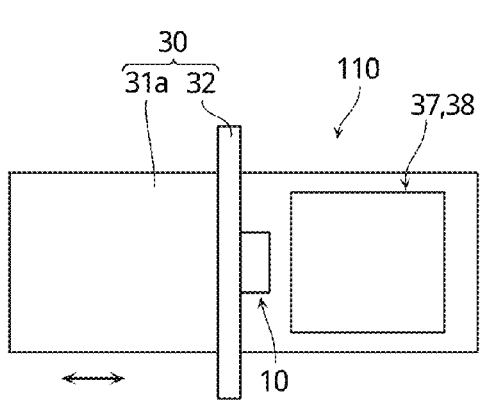

FIGS. 9A and 9B are the diagrams illustrating variants of the measurement apparatus. As illustrated in FIG. 9A, the XY table device 110 may be a movement mechanism not including the measurement table 39 and the drive motor of the drive unit 30, for example. By doing so, the above measurement processing can be performed by arranging the final contract proof 37 or the printed matter 38 at the basic setting position on a planar board such as typical working desk and manually moving the Y axis support member 32 relative to the X axis support member 31 in the X axis direction, and moving the measurement instrument 10 relative to the Y axis support member 32 in the Y and Z axis directions.

In this case, roller members (not illustrated) for facilitating a movement and supporting the Y axis support member 32 are attached at both ends of the Y axis support member 32. The XY table device 110 with such a simple structure is easy to carry. Further, in the XY table device 110 with the structure, two positioning pin members (not illustrated) as long as contactable on at least one side of the final contract proof 37 or the printed matter 38 may be provided on the X axis support member 31 and the Y axis support member 32, respectively, in order to prevent angle bending and to facilitate the final contract proof 37 or the printed matter 38 to be placed at the basic setting position.

As illustrated in FIG. 9B, the XY table device 110 may have the drive unit 30 including an X axis direction carrier 31a instead of the X axis support member 31 and may be configured such that the X axis direction carrier 31a moves relative to the Y axis support member 32 relatively in the X axis direction. By doing so, the measurement processing described above can be performed by moving the measurement instrument 10 in the Y and Z axis directions while moving the X axis direction carrier 31a mounting the final contract proof 37 or the printed matter 38 thereon instead of the measurement table 39 or the board of a working desk. Further, the final contract proof 37 or the printed matter 38 can be continuously carried, thereby enhancing a working efficiency.

By use of the XY table device 110 with various structures, the measurement instrument 10 can be freely moved in the X, Y, and Z axis directions and the same position can be measured also when the position of the final contract proof 37 or the printed matter 38 is different due to expansion/contraction or layout-imposing of the sheet. Further, since the measurement information such as calculated XY coordinate value or measurement results is stored, the measurement processing using a coordinate value can be automatically and continuously performed when the same measurement point is measured on the final contract proof 37 or the printed matter 38 with the same size including the same image after the second and subsequent times.

Figure 10:
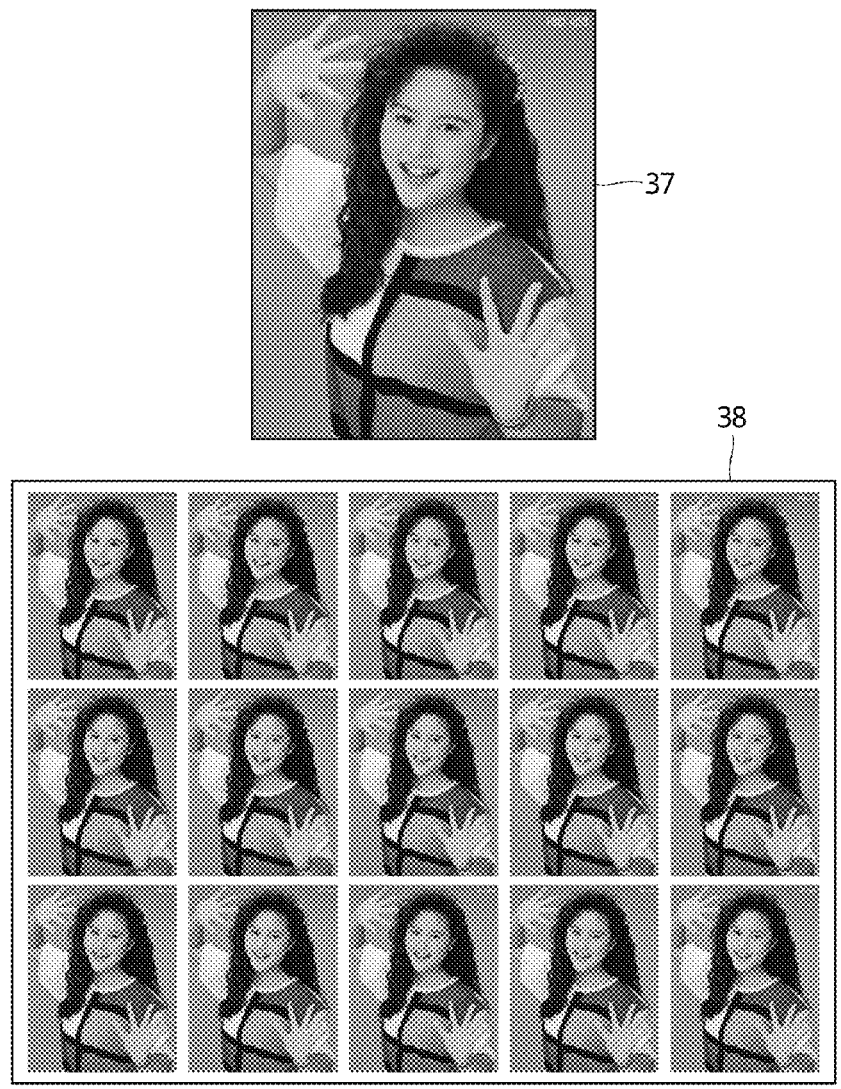
FIG. 10 is a diagram illustrating an exemplary measurement by same measurement apparatus.
Figure 11:
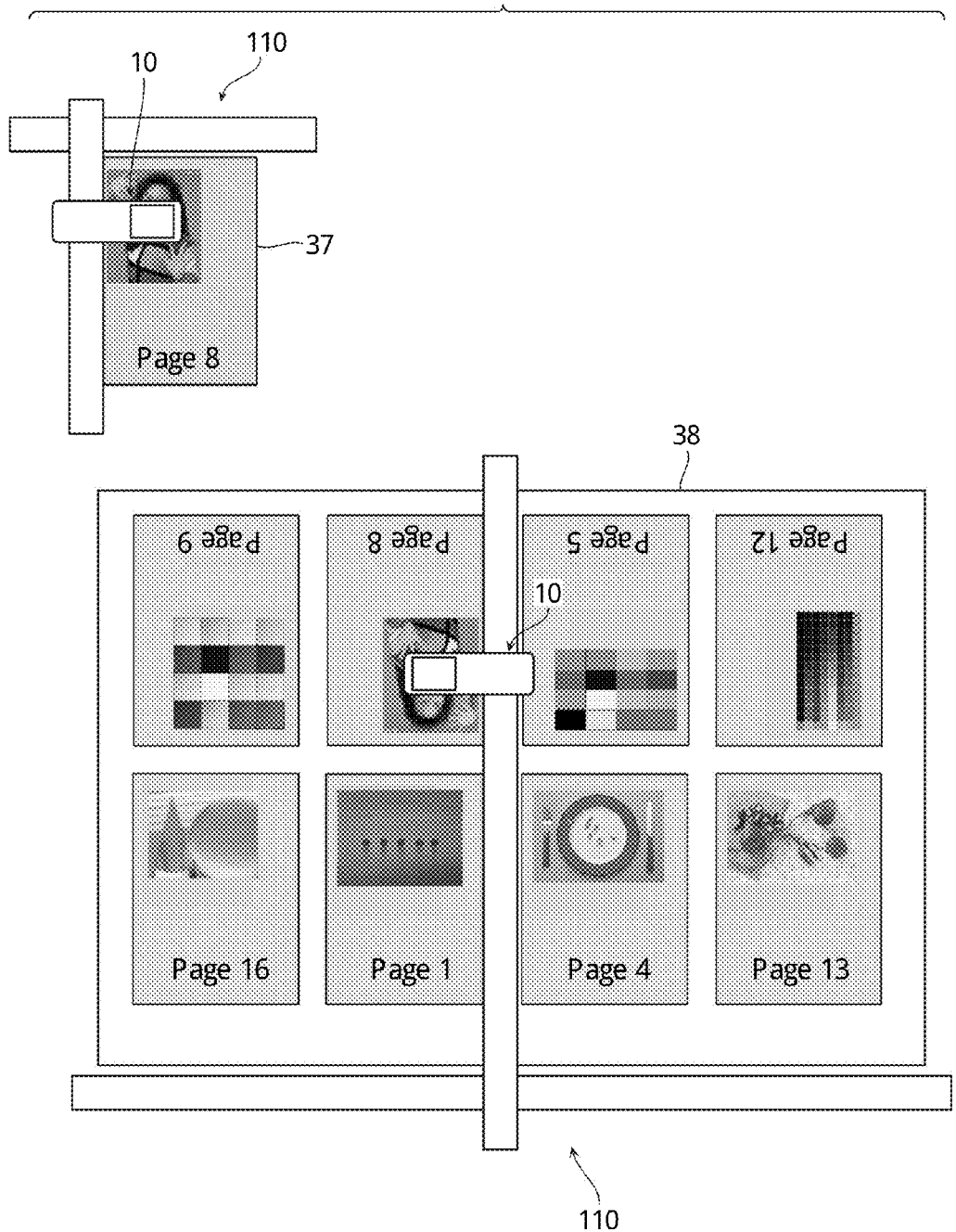
FIG. 11 is a diagram illustrating an exemplary measurement by same measurement apparatus.

FIG. 10 and FIG. 11 are the diagrams illustrating exemplary measurements by the measurement apparatus. With the measurement apparatus 100, also when the measurement values of the measurement points at the same position between the single-side printed final contract proof 37 (with only one single-side image printed) and the multi-imposition printed matter 38 (with a plurality of single-side images printed) or the bite-imposition printed matter 38 (not illustrated) are compared and evaluated as illustrated in FIG. 10 or when the measurement values of the measurement points at the same position between the single-side printed final contract proof 37 and a corresponding page of the page-imposed printed matter 38 are compared and evaluated as illustrated in FIG. 11, the final contract proof 37 and the printed matter 38 can be measured and compared at the same position easily and inexpensively. Note that when the printed matter 38 is multi-imposition printed, bite-imposition printed, or page-imposition printed, the measurement origin 34a of the printed matter 38 may be input on each single-side printed image.

Figure 12:
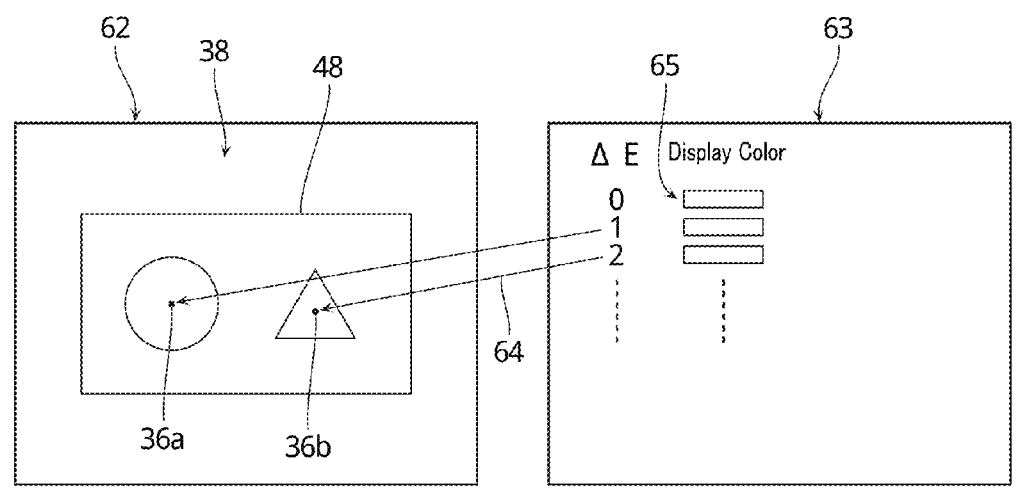
FIG. 12 is a diagram illustrating an aspect to display a color evaluation result based on comparative evaluation information by same measurement apparatus.

FIG. 12 is a diagram illustrating an aspect to display a color evaluation result based on the comparative evaluation information by the measurement apparatus. The color difference data as a color evaluation result of the comparative evaluation indicated by the comparative evaluation information may be displayed on the display unit 22 or the display screen 61 of the display 60 by at least one of colors, characters or numerals as illustrated in FIG. 12, for example.

FIG. 12 illustrates, by way of example, that an image display column 62 in which the measurement-image 48 on the printed matter 38 is displayed together with the measurement points 36a and 36b and a data display column 63 in which a color difference value or color information at each measurement point 36a, 36b on the measurement-image 48 displayed in the image display column 62 is indicated by colors, characters, or numerals are displayed on the display unit 22 or the display screen 61. The final contract proof 37 can be similarly displayed.

The display position of each measurement point 36a, 36b on the measurement-image 48 in the image display column 62, and each color difference value in the data display column 63 may be displayed to be linked via an arrow 64 or the like, for example, for comprehensible correspondence in order to easily grasp the color difference ΔE. The color evaluation result of each measurement point 35a, 35b, 36a, 36b is displayed in this way, and thus the contents thereof can be intuitively determined visibly.

Further, the reference-image 47 and the measurement-image 48 on the final contract proof 37 and the printed matter 38 may be displayed in the image display column 62 side by side or alternately displayed thereby to display a corresponding color difference value or color information in the data display column 63. When a list of measured color difference values or color information as in the data display column 63 is associated with each measurement point 35a, 35b, 36a, 36b based on the color evaluation results, the numerals or colors in a color information numeric display frame 65 can be correspondingly changed to be displayed when any measurement point is selected by use of the mouse 52 or the like.

In this way, when magnitude relationships between color measurement values or color difference values are made displayable in a list and are displayed in colors, a determination as to whether an analysis result at a measurement point on the image is right can be made easily and instantly based on the color evaluation result. The color measurement values or color difference values can be also indicated by color difference average values, average color difference values, or numerals using both of them within the aperture diameter of the measurement aperture unit 18 at each measurement point on the reference-image 47 and the measurement-image 48.

Figure 13A:
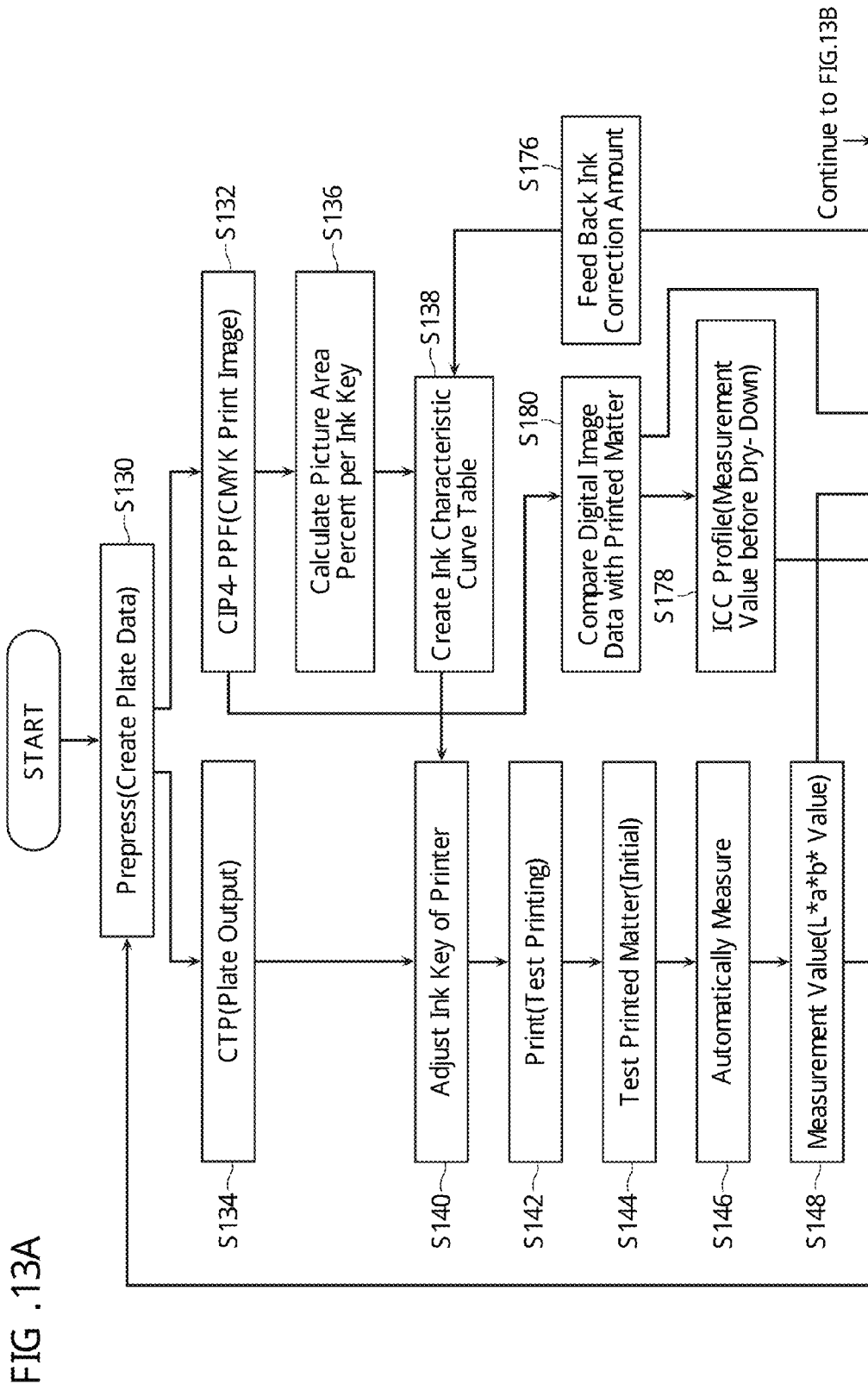
FIGS. 13A, 13B and 13C are flowcharts illustrating a series of color evaluation analysis and color adjustment processing by use of the comparative evaluation information in same measurement apparatus.
Figure 13B:
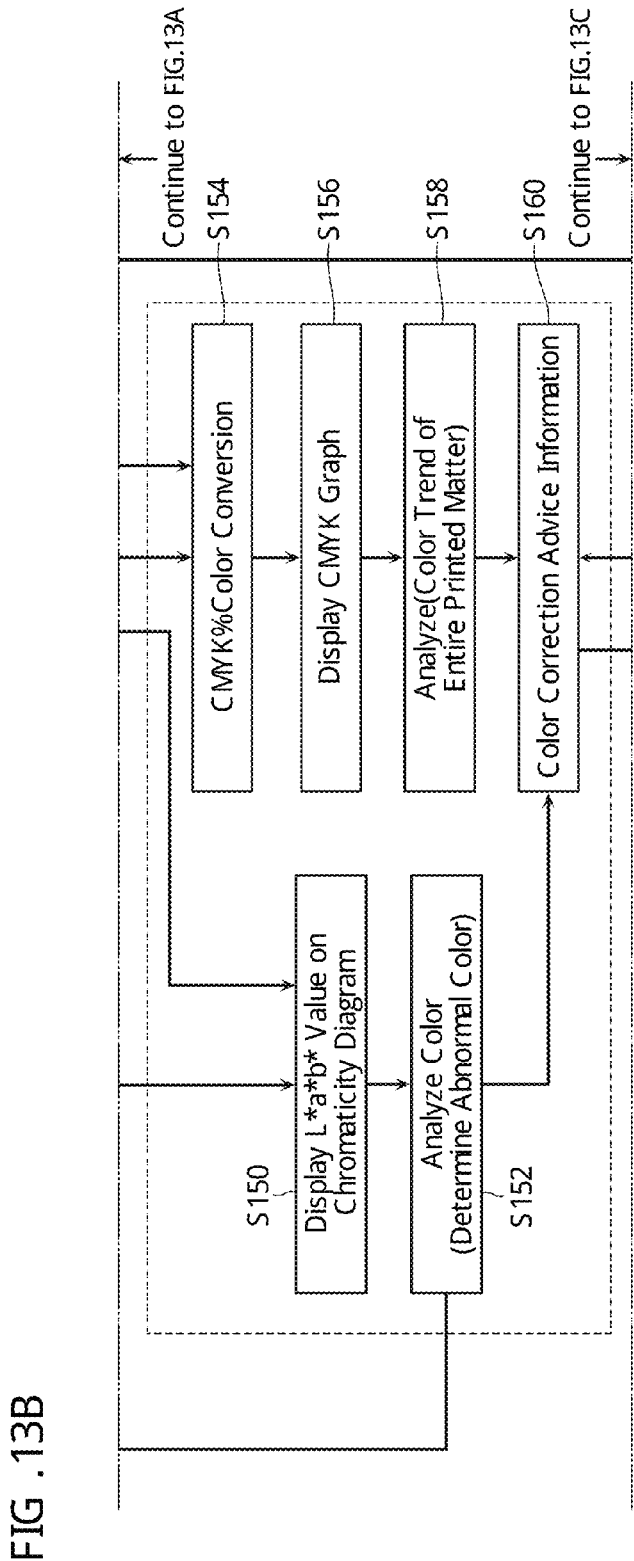
Figure 13C:
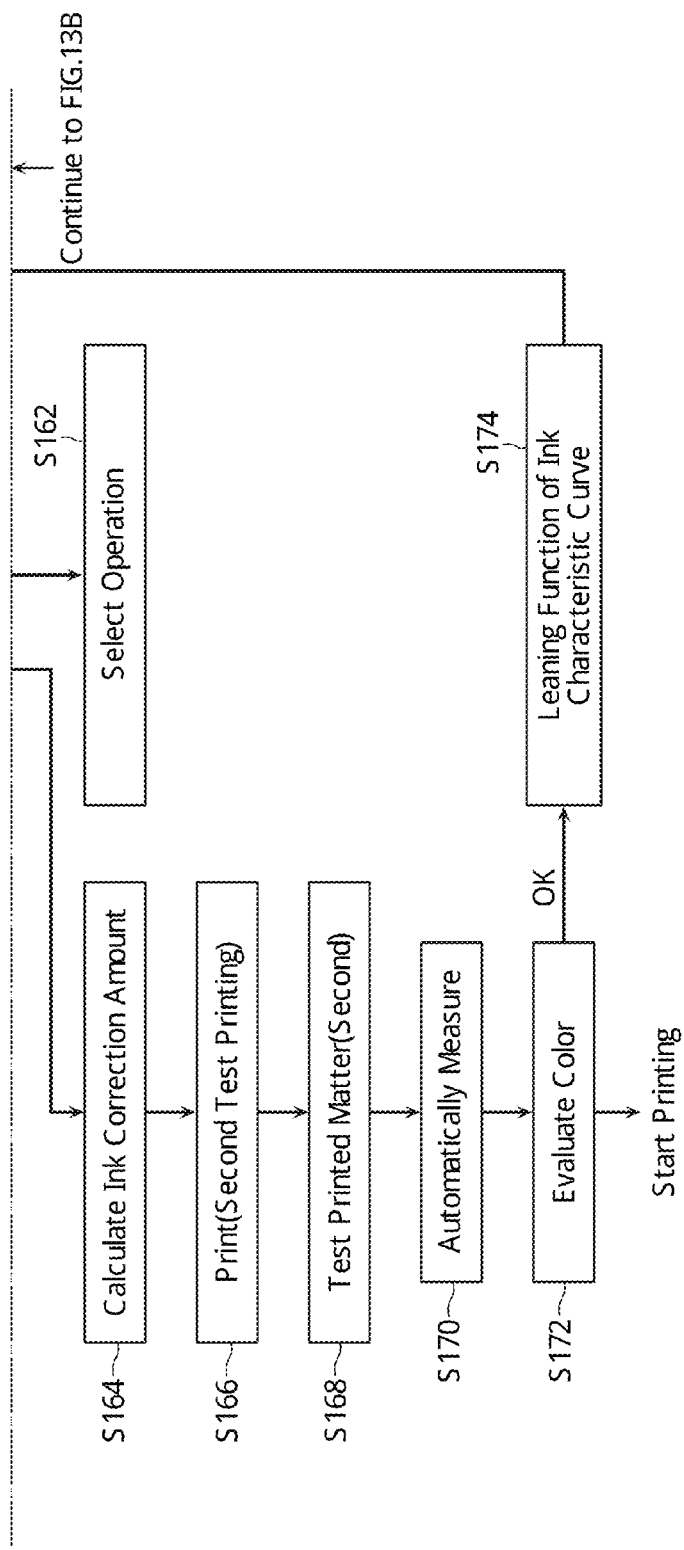

FIGS. 13A, 13B and 13C are flowcharts illustrating a series of color evaluation analysis and color adjustment processing using the comparative evaluation information in the measurement apparatus. FIGS. 13A to 13C illustrate, for example, a flow after creating plate data of the final contract proof 37 in prepress and making measurements and color evaluations of the measurement points of the picture images and the control strip images of the reference-image 47 and the measurement-image 48 and until making a color adjustment of the printer 130 and starting the printing.

When the color of the measurement-image 48 on the test printed matter 38 printed is different from the color of the reference-image 47 on the final contract proof 37 when the test printed matter 38 is test printed (color adjustment test printing), the CMYK ink amount per each ink keys of the printer 130 is increased or decreased, and test printing is performed several times until the colors match, thereby making a color adjustment. With the measurement apparatus 100, the measurement points can be set at the same position between the final contract proof 37 and the printed matter 38, thereby making an accurate color evaluation.

It is assumed herein that the controller 20 in the XY table device 110 includes all the functions of the computer 120. In the following series of processing, the colors of the measurement-image 48 on the printed matter 38 can be managed with reference to the measurement values of the final contract proof 37, or the colors of the printed matter 38 can be managed assuming the L*a*b* value which is the converted CIP4-PPF image as reference color management data.

As illustrated in FIG. 13A, prepress (plate data creation) is first performed (step S130), then the controller 20 receives image data (CMYK print image data) of the CIP4-PPF file from the prepress (step S132), and performs CTP (plate output) (step S134).

Then, a picture area percent per ink key of the printer 130 is calculated based on the received image data (step S136). After the picture area percent is calculated, an ink characteristic curve table as a graph indicating the ink amount relative to the picture area percent is created (step S138), and dial values (printer-specific values) of all the ink keys (about 20 to 30 ink keys, for example) from left to right on the printed side are displayed on the display screen of the display unit 22.

The controller 20 makes an ink key adjustment by setting the displayed dial values in the color adjustment unit in the printer 130 (step S140). The dial values may be manually set in the color adjustment unit. When the printer 130 is away from the controller 20, the dial values may be set online.

While a register adjustment is being made in the printer 130, test printing is performed for about 100 sheets, for example (step S142), and the test printed matter 38 is acquired at the initial color adjustment (step S144). After the initial test printed matter 38 is acquired, the measurement instrument 10 in the XY table device 110 automatically measures the measurement points 36a and 36b in the picture images 48a and 48b in the measurement-image 48 on the printed matter 38 corresponding to the measurement points 35a and 35b on the final contract proof 37, and the control strip image 48c (step S146), and acquires the measurement values (L*a*b* values) (step S148).

As illustrated in FIG. 13B, after the measurement values are acquired, the L*a*b* values are recorded and displayed in a chromaticity diagram based on the measurement values (step S150), and a color analysis at each measurement point is made based on the chromaticity diagram (step S152). In the color analysis, a determination is made as to whether an abnormal color (data) indicating a different direction is present among the measured measurement points.

When it is determined that an abnormal color indicating a different direction is present through the color analysis, the abnormal color is marked and displayed to be notified to the operator, and when a conspicuously-different color shift is caused, the processing returns to the prepress step in step S100 to determine whether to recreate the plate data.

The determination as to whether to recreate the plate data is made based on, for example, important colors for the print orderer, a premise of coloring such that stored colors such as gray, skin color, sky blue, grass green, and soil color when a picture area is large and conspicuous (colors being stored in association with specific events such as an apple is red), or concept colors such as healthy skin color, beautiful skin color, and leaf color.

Printed color samples (color chips) close to such concept colors are created and the color samples are measured to acquire L*a*b* values so that the L*a*b* values may be compared and evaluated with the L*a*b* values of the printed matter 38 thereby to create color-adjusted plate data.

The L*a*b* value acquired in step S148 is subjected to CMYK % color conversion by use of the ICC profile created under the same condition (step S154), and a difference between the reference value of the image data and the measurement value of the printed matter 38 is recorded and displayed in a visibly-confirmable CMYK graph (step S156). The CMYK graph will be described herein.

Figure 14:
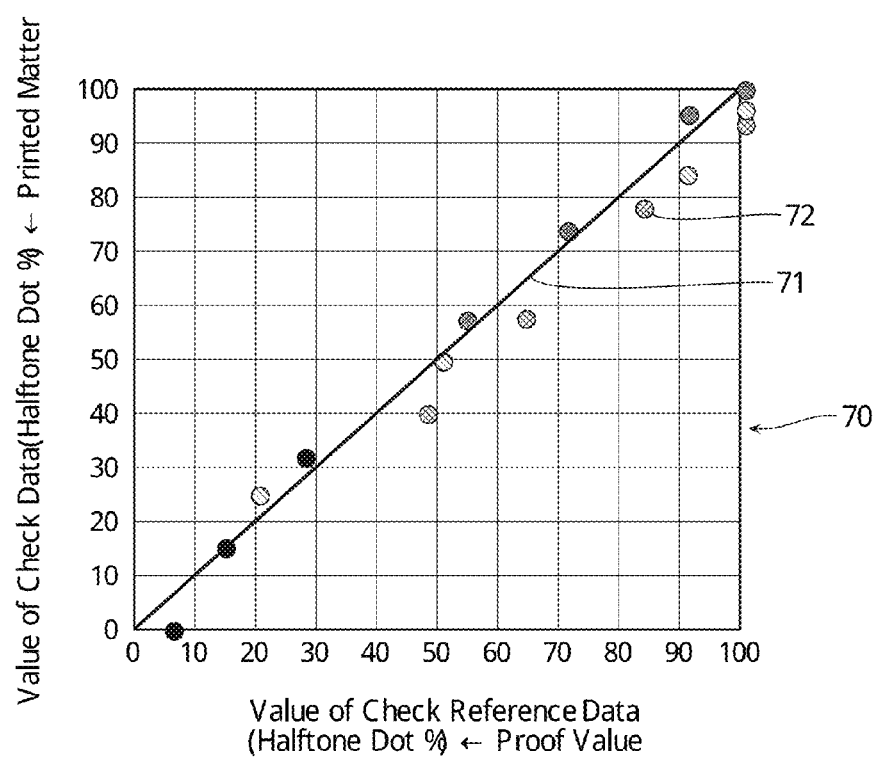
FIG. 14 is a diagram illustrating a CMYK graph in same measurement apparatus.
Figure 15:
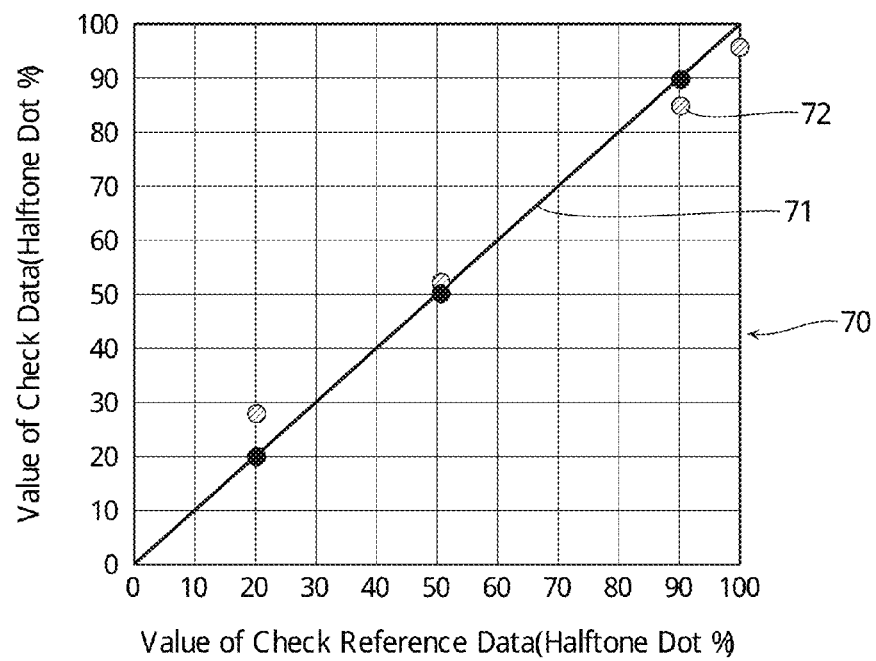
FIG. 15 is a diagram illustrating same CMYK graph.
Figure 16:
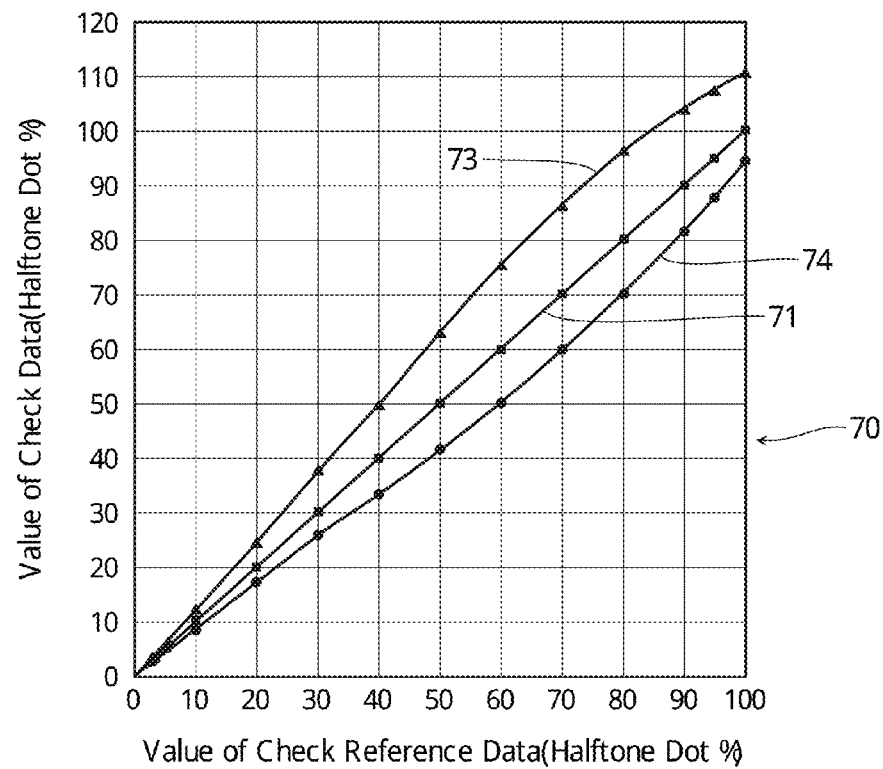
FIG. 16 is a diagram illustrating same CMYK graph.

FIG. 14 to FIG. 16 are the diagrams illustrating the CMYK graphs. For color adjustments, for example, if the colors of the entire image are to be adjusted by only specific colors of the picture images 48a and 48b in the measurement-image 48, other colors of the picture images 48a and 48b are not necessarily correctly adjusted. The CMYK graphs indicate color effects on the entire image, which enables the colors in the total gradation to be predicted, and are created for making an optimum color adjustment including the colors of the control strip image 48c in consideration of the total gradation. That is, by use of the CMYK graph, the measurement value (L*a*b* value) of the measurement point 36a, 36b on the printed matter 38 is compared with the measurement value (L*a*b* value) of the control strip image 48c in the same ink key sequence, thereby grasping a deviation in color while totally viewing the entire color gradation reproduction of the printed matter 38 or the like.

That is, when the colors which are measured with reference to one measurement point of a picture image and are subjected to CMYK conversion are displayed, a correct color balance may not be achieved due to not only a balance of the CMYK ink amount but also a problematic picture image (picture image data). The measurement values measured at some measurement points are plotted on the CMYK graph as a color reproduction graph for comparing check reference data and check data, thereby easily comparing the balances of the entire images.

A correlation between the control strip image and the picture image is important, and thus a determination as to whether color reproduction in basic printing can be properly corrected can be made by comparing the colors of the solid color patches of the control strip image 48c, for example, thereby adjusting the ink amount reasonably. Further, if an outstanding color is present, it is displayed opposite to other picture images or the control strip image, thereby immediately finding the problematic picture image.

Color evaluation information in the CMYK graph is calculated by the control unit 21 in the controller 20, for example. That is, the measurement values of the reference-image 47 and the measurement-image 48 are converted into a halftone dot percent by use of the color conversion table, a color difference at each measurement point is compared as the CMYK ink correction amount, and all the measurement results of the picture images 47a, 47b, 48a, 48b and the control strip images 47c and 48c are plotted on the graph indicating an increase/decrease relationship of the measurement values of the measurement-image 48 relative to the reference-image 47 so that the color evaluation information is calculated.

As illustrated in FIG. 14, the CMYK graph 70 indicates a value of the check reference data (halftone dot %) as a proof value in the horizontal axis (x axis) and indicates a value of the check data (halftone dot %) of the printed matter 38 in the vertical axis (Y axis). A reference line 71 is indicated at a middle portion between the values on the vertical axis and the horizontal axis. The fact a plot point 72 is present on the reference line 71 indicates that a value of the check data conforms to the check reference. The plot points 72 are displayed in CMYK colors for easily viewing plate colors, for example.

With thus-configured CMYK graph 70, a tone curve of the entire gradation such as dot gain can be predicted based on the number of measurements of picture images with less pictures, or an effect of color reproduction on an entire picture image or an entire printed matter can be visually confirmed when the ink amount is increased or decreased, thereby accurately determining the color adjustment.

As described above, when displayed in four CMYK colors at the same time, the plot points 72 may be difficult to visually confirm, and thus may be switched and displayed for each color. The cyan (C) color plot points 72 are displayed in the CMYK graph 70 illustrated in FIG. 15. In this case, it can be seen that when the halftone dot % of cyan is around 90%, the color is lacking, but when it is middle tone of around 20% to 50%, the amount is proper or slightly excessive.

In such a case, the operator determines which to emphasize the check reference data or the check data. As illustrated in FIG. 16, a change status in dot gain curve can be displayed in the CMYK graph 70 when an ink density is changed. The reference line 71 indicates a dot gain curve at a standard density, a comparative line 73 indicates a dot gain curve at a higher density, and a comparative line 74 indicates a dot gain curve at a lower density. Therefore, the color density or L*a*b* values relative to the ink amounts acquired by previous test printing by use of various inks or printing sheets, and the changes in dot gain are recorded in data, thereby calculating the ink correction amount based on a color difference due to the L*a*b* values when the pictures of the reference-image and the measurement-image are measured, and an accurate color correction is made.

In the case illustrated in FIG. 16, it can be seen that even if the cyan ink amount is increased or decreased, its effect is less on 20% or less and its effect is larger on middle tone (about 50%) to 80%. In this way, the CMYK graph 70 can be used as a tool for facilitating the operator to determine whether to increase or decrease the ink amount for color adjustments.

A value of 100% of the check reference data indicates a measurement value of the control strip image within the same ink key as the measurement point to measure the picture image, thereby confirming whether the control strip image is printed at density conforming to the value of the check reference data. Further, since 100% or more of halftone dots is not displayed, when printing is performed at a higher density of the ink amount at a 100% solid portion than the reference value, the fact is not displayed in the graphs in FIG. 14 and FIG. 15. FIG. 16 is used for displaying how excessive the ink amount is in a graph by displaying 100% or more when the ink density exceeds the reference value, or accurately calculating the excessive ink correction amount based on a color density at the solid portion and controlling the ink key of each color of the printer.

In this way, since when a picture image is subjected to a color adjustment, for example, an increase or decrease in the ink amount also influences the control strip image, the CMYK graph 70 enables a determination as to whether the increase or decrease amount is in a proper range. When it is determined, for example, that the increase or decrease in the ink amount is not proper, the processing returns to the prepress step in step S100 as described above, where the plate data is subjected to color correction or dot gain correction by a CTP recorder thereby to create new plate data and the plate data is recorded to be reprinted, for example.

Returning to FIG. 13B, when the CMYK graph 70 is created in step S156, the created CMYK graph 70 is used to analyze a color gradation-based color trend of the entire printed matter 38 per CMYK ink (step S158), and to display and confirm a status of the color gradation reproduction by the CMYK graph 70 on the display screen.

Then, the increase or decrease of color is compared between the measurement value of the control strip image 48c and the measurement value of the picture image 48a, 48b by the CMYK graph 70 so that color correction advice information for avoiding an extreme color correction and determining a safe color adjustment method is displayed on the display screen (step S160).

When a measurement value (color measurement value) indicates density, the reference value and the measurement value are assumed as density thereby to be plotted on the CMYK graph 70. Therefore, it is possible to accurately calculate the ink correction amount based on an analysis result of the CMYK graph 70 in the same way.

According to the color correction advice information, for example, a picture image or the like at a measurement point having an adverse effect is displayed to be visually confirmable when the picture image with an abnormal color is marked and displayed and the ink amount is corrected, which facilitates operator's determinations. In order to seek an operator's determination, an increase or decrease value of the ink correction amount acquired by measuring the control strip image 48c is compared with an increase or decrease value of the ink correction amount acquired by measuring the picture image 48a, 48b as described above so that when the increase or decrease is in the same direction, the ink correction amount is displayed, and when the increase or decrease is in the reverse direction, the evaluation result with a comment is displayed.

As illustrated in FIG. 13C, when the color correction advice information is displayed, an operation system emphasized on the ink correction amount of the picture image or the control strip image is selected (step S162), thereby displaying the corrected ink amount on the display screen based on the measurement result of the picture image according to a selected operation system.

For selection of an operation system, not an operation emphasized on either image but an intermediate (100% to 0%) operation can be selected. For example, when the picture image is 100% emphasized, only a measurement result of the picture image may be displayed as the ink correction amount, and when the picture image is 0% emphasized, a measurement result of the control strip image may be displayed as the ink correction amount as it is. Further, the fact is used for controlling an ink key of each color of the printer.

When an operation system is selected in this way, the ink keys of the printer 130 are set in step S140, for example. The ink keys are set online or manually as described above. A setting value for determining a picture image-emphasized or control strip image-emphasized operation system is freely selectable, and the setting value is displayed on the display screen as a % value of the ink correction amount or an actual dial value of the ink keys of the printer 130. Further, the fact is used for controlling an ink key of each color of the printer.

Even if the control strip image 47c is not included in the reference-image 47 on the final contract proof 37, the ink characteristic curve table created by the printer 130 and under the print conditions such as sheet and ink type is used, and thus the entire printed matter 38 can be printed at a uniform density based on density which is considered to be certainly accurate also at the initial printing of the printed matter 38.

The ink correction amount is calculated based on the color correction advice information (step S164), and the ink amount of the printer 130 is corrected based on the calculated ink correction amount and then the second test printing is performed (step S166) thereby to acquire the test printed matter 38 by the second test printing (step S168).

The test printed matter 38 by the second test printing is automatically measured as same as in step S146 (step S170) thereby to acquire a measurement value (L*a*b* value) and to make a color evaluation (step S172). When it is determined that proper color reproduction is achieved in the printed matter 38 based on the color evaluation result, a production run printing is started and the series of processing in the flowchart is terminated.

When proper color reproduction is achieved (OK), a learning start button of a learning function of the ink characteristic curve additionally displayed on the display screen is pressed to activate the learning function (step S174), and the ink correction amount acquired at this time is fed back to the ink characteristic curve table created in step S138 as illustrated in FIG. 13A (step S176).

Thereby, the ink characteristic curve table directly corrected by the ink correction amount, or the ink correction amount fed back by duplicating the ink characteristic curve table can be added with date information or the like to be saved. If the ink characteristic curve table with the ink correction amount fed back is saved each time printing is performed under a different print condition, for example, the saved ink characteristic curve can be used when the same print condition is used for other printing by chance. In such a case, printing can be performed by hardly performing the ink amount correction processing, thereby remarkably reducing the number of color adjustments.

When the control strip image is ignored to make an extreme correction even under the same print condition, without performing steps S174 and S176 and learning the ink correction amount, only a correction value of the ink correction amount is saved and next printing is performed by use of the correction value saved when the same picture image is reprinted.

There has been described above the comparative evaluation between the measurement values of the final contract proof 37 and the printed matter 38, but there may occur a dry-down phenomenon in which density of the printed matter 38 entirely lowers when about one day elapses, for example. Thus, the ICC profile created by use of a L*a*b* value previously measured before the dry-down phenomenon only for the final contract proof 37 is used (step S178) during color conversion from a L*a*b* value to CMYK % as in step S154, thereby simulating a color immediately after the printing. By doing so, a color difference between the final contract proof 37 and the printed matter 38 can be more accurately compared and evaluated.

Also when the digital image data and the printed matter 38 are compared and evaluated (step S180), color conversion is performed from CMYK % to a L*a*b* value, for example, by use of the same ICC profile as in step S178, thereby acquiring a measurement value before the dry-down phenomenon. Thus, the color comparative evaluation with the printed matter 38 is enabled. Also when a comparative evaluation is performed in CMYK %, a L*a*b* value after the color conversion is converted into CMYK % again, thereby more accurately making a comparative evaluation.

Figure 17:
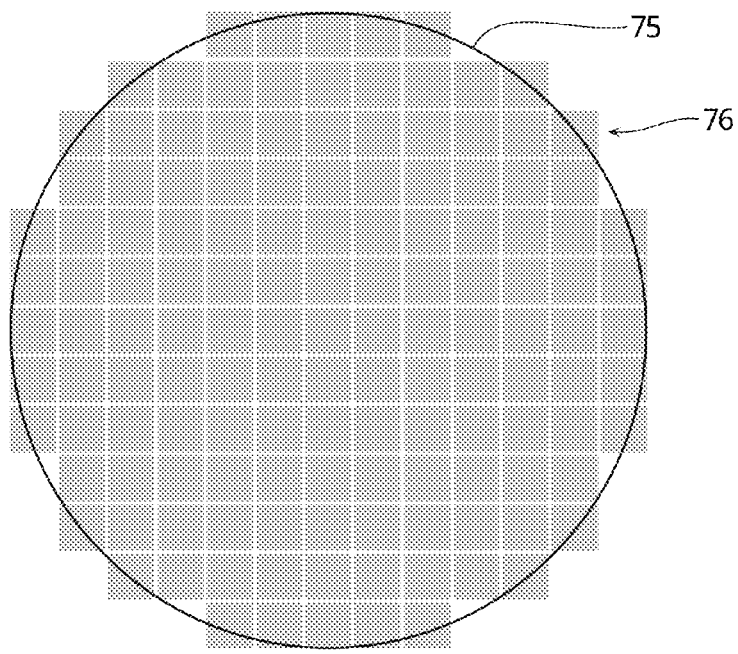
FIG. 17 is a diagram for explaining an analog aperture and a digital aperture in same measurement apparatus.

FIG. 17 is a diagram for explaining an analog aperture and a digital aperture in the measurement apparatus. It is possible in the measurement apparatus 100 that the measurement points indicated by the digital image data (such as PPF data, TIFF image data, or PDF data) on an entire image for printing, and the XY coordinate value of each measurement point 36a, 36b on the printed matter 38 or the like are plotted and displayed on the image data on the display screen, and a measurement value acquired by actually moving the measurement instrument 10 and the measurement value of the digital imaged data are compared and evaluated, thereby making a color evaluation. That is, matching between, or measurement or color evaluation of the entire image data and a partial image can be made.

In this case, the aperture diameter of the digital aperture 76 is set to be equivalent to the aperture diameter of the analog aperture 75 of the measurement aperture unit 18 in the measurement instrument 10 based on the resolution and the data size of the digital image data, thereby making measurements. Thereby, the range of color comparative evaluation is set at the same size between digital and analog, thereby making a color comparative evaluation.

The aperture diameter of the analog aperture 75 of the measurement aperture unit 18 in the measurement instrument 10 is physically determined, and thus cannot be generally changed. Therefore, in order to accurately match the shape and the aperture diameter of the digital aperture 76 with those of the analog aperture 75, image data with a higher resolution needs to be used, and a comparison accuracy for the color comparative evaluation depends on this resolution.

Specifically, in consideration of the aperture diameter of the analog aperture 75 of 2.5 to 3.0 mm, for example, the resolution of the digital image data is desirably 50 pixel/cm (about 125 dpi) or more. By doing so, the digital aperture 76 having substantially the same shape and range as the analog aperture 75 can be used as illustrated.

Figure 18:
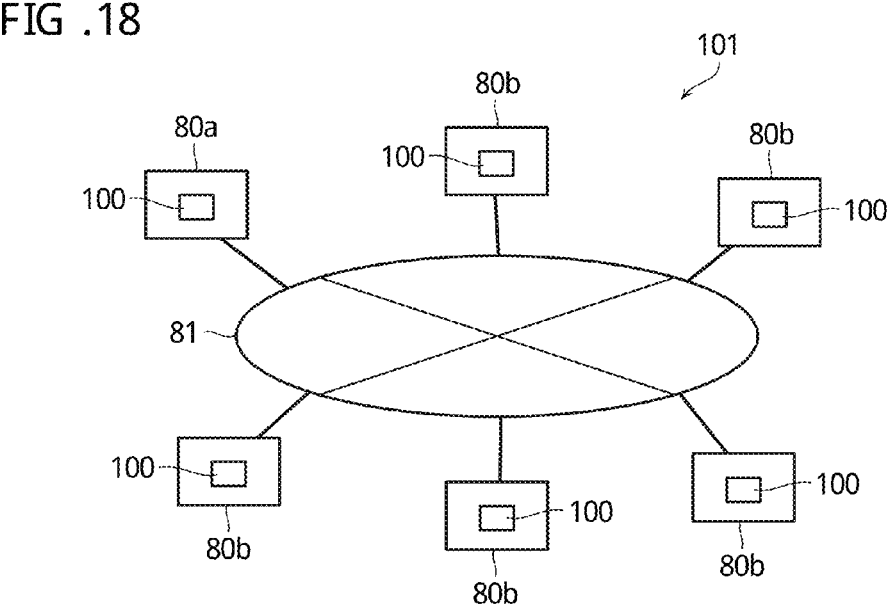
FIG. 18 is a diagram illustrating a measurement system according to another embodiment of the present invention.

FIG. 18 is a diagram illustrating a measurement system according to another embodiment of the present invention. A measurement system 101 according to the present embodiment is such that a plurality of information processing apparatuses 80*a* and 80*b* are connected to each other via a network 81. Each information processing apparatus 80*a*, 80*b* includes the measurement apparatus 100 including the measurement instrument 10 and the XY table device 110, at least one information processing apparatus 80*a* includes a server function, and the other information processing apparatus 80*b* includes a client function.

With thus-configured measurement system 101, the final contract proof 37 and the printed matter 38 can be compared and evaluated in each information processing apparatus 80*a*, 80*b* provided at a different location via the network 81. For example, an origin position and measurement points of the base image data are set in the information processing apparatus 80*a* as described above. Further, the reference origin 33*a* of the final contract proof 37 is set, and the measurement is made at each measurement point 35*a*, 35*b*.

The origin position of the base image data is set by designating the origin as a reference absolute position of the center register marks 37*b* or the cutting marks 37*a* of image data such as CIP4-PPF data, TIFF-CMYK data, 1 bit-TIFF data, or PDF data displayed on the display screen, for example, from the image data automatically or by the input unit 23 as described above. Moreover, a measurement point is set by designating a position to be measured in the image data displayed on the display screen by the input unit 23.

The reference origin 33*a* and the measurement points 35*a* and 35*b* of the final contract proof 37 are set as described above. The position (XY coordinate value) of the measurement point 35*a*, 35*b* relative to the reference origin 33*a* may be corrected based on the reference absolute position (the origin of the image data), and the position of the measurement point 35*a*, 35*b* relative to the reference origin 33*a* including the position-corrected XY coordinate value may be saved as reference absolute position data. The information processing apparatus 80*a* then transmits the reference data including various items of data on the final contract proof 37 and the like to the information processing apparatus 80*b*.

The information processing apparatus 80*b* receives the reference data transmitted from the information processing apparatus 80*a*. The measurement origin 34*a* of the printed matter 38 is set, and the measurement is made at the measurement points 36*a* and 36*b* corresponding to the measurement points 35*a* and 35*b*. The measurement origin 34*a* is set as described above. Each measurement point 36*a*, 36*b* reflects the above scale information on the measurement point 35*a*, 35*b* to be found as the XY coordinate value based on the print reference position information on the cutting marks 38*a* of the printed matter 38, the reference origin 33*a* of the final contract proof 37, or the reference absolute position data. Then, the measurement instrument 10 in the measurement apparatus 110 is moved to each measurement point 36*a*, 36*b* to make a measurement based on the found XY coordinate value. Then, the measurement data is acquired, and a comparative evaluation is made per measurement point by use of the measurement information of the reference data, thereby acquiring comparative evaluation information.

When test objects to be tested of two or more types, such as the final contract proof 37 and the printed matter 38, are present in distant locations, the information processing apparatuses 80*a* and 80*b* mutually exchange specific position information and measurement information on the final contract proof 37 via the network 81, for example. The specific position information includes size information on two or more points within the final contract proof 37, and distance and angle information on the measurement instrument 10 relative to the reference origin 33*a*.

For the comparative evaluation, the final contract proof 37 is first measured, and then the measurement information including the measurement results and the coordinate values of the measurement points 35*a* and 35*b* is transmitted to a printing factory or the like at a distant location via the network 81 such as Internet, or saved and shared in a server (not illustrated) provided in the information processing apparatus 80*a*, for example, to be made available to the other information processing apparatus 80*b*. Thereby, when the other information processing apparatus 80*b* measures the printed matter 38, the measurement points 36*a* and 36*b* at the same positions on the printed matter 38 can be accurately measured based on the measurement results and the coordinate values of the final contract proof 37.

When the information processing apparatus 80*b* includes the printer 130 and finishes printing the color-adjusted printed matter 38, a color quality evaluation report for confirming color quality based on the measurement results of the printed matter 38 as OK sheet may be automatically fed back to each information processing apparatus 80*a*, 80*b*. Thereby, the quality of the printed matter 38 can be ensured. The color quality evaluation report will be described below.

With the measurement system 101, more rapid printing steps and organization can be constructed in a simple and inexpensive configuration. For example, a printing company installs sales offices at different locations from the headquarters, has the design department under a different company from the headquarters, or has business ties with an outsourcing company. Further, a printing factory is located away from the headquarters in many cases.

Thus, color management may be made by use of the server function of the information processing apparatus 80*a*. In this case, for example, printing data for the DTP application ordered in a sales office is first saved in the server of the information processing apparatus 80*a* in the headquarters. Then, the final contract proof 37 is printed in the information processing apparatus 80*b* in the design department by use of the printing data from the server of the information processing apparatus 80*a* in the headquarters, is compared and evaluated with a client's print sample or the like to make a color adjustment again, and is output as color-corrected sheet data to be transmitted to the information processing apparatus 80*b* in the sales office.

In the sales office, the color-corrected sheet is printed based on the color-corrected sheet data, the corrected colors are presented to the client or converted into PDF data to be subjected to electronic color correction so that client's agreement is finally gained thereby to acquire image data on the final contract proof 37. In the prepress department in the headquarters, the final contract proof 37 is printed based on the image data on the final contract proof 37 to arbitrarily measure any measurement point 35a, 35b in an important picture image or the like, and print JOB information or L*a*b* values as measurement values are saved in the server of the information processing apparatus 80a together with the image data, the coordinate values, and the like in association with 1-bit print data.

In the printing factory, the information processing apparatus 80b receives the 1-bit print data transmitted from the information processing apparatus 80a in the prepress department in the headquarters, and by use of the same, printing is performed by the printer 130. The JOB information, the L*a*b* values, and the like are received together with the information such as the print PPF image data and the coordinate values indicating the measurement points saved in the server of the information processing apparatus 80a, and measurements are made at the measurement points at the same positions as in the print PPF image data and the test printed matter 38 test-printed, thereby making a color comparative evaluation.

In this way, in the measurement system 101, the measurement points at the same positions on the base image data, the final contract proof 37, and the printed matter 38 are measured in each information processing apparatus 80a, 80b, thereby easily confirming whether the printed matter 38 is printed in the same colors as the image data of the printing data transmitted from the information processing apparatus 80a, for example.

Figure 19:
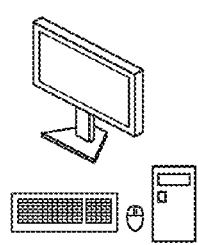
FIG. 19 is a diagram illustrating a basic structure of same measurement system.
Figure 19:
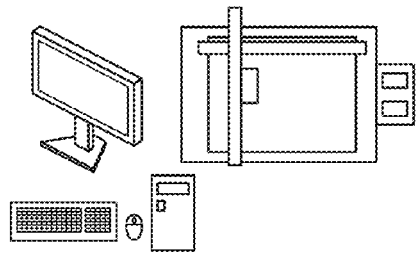
Figure 19:
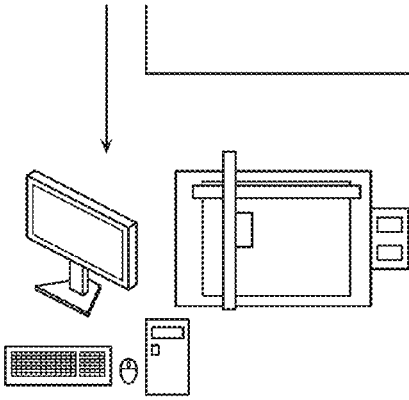
Figure 19:
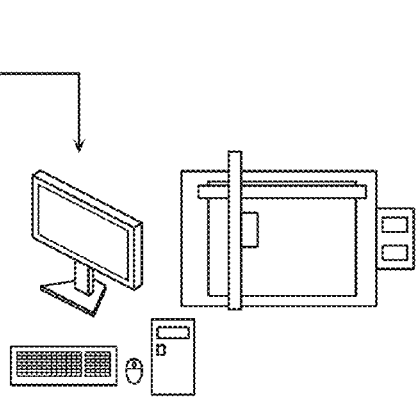

FIG. 19 is a diagram illustrating a basic structure of the measurement system. In the Figure, "a" indicates an instruction-exclusive computer, "b" indicates a measurement apparatus for measuring both a reference-image and a measurement-image, "c" indicates a measurement apparatus for measuring the reference-image, and "d" indicates a measurement apparatus for measuring the measurement-image. Three exemplary structures will be demonstrated herein. In the following, an image extreme point indicates a register mark or an end of an image. A plurality of image extreme points for designating an image size of the reference-image are present in one image in multi-imposition.

(1) First Exemplary Structure

The instruction-exclusive computer a designates a reference origin, an image extreme point and a measurement point of the reference-image, transmits data to the measurement apparatus b, c or d, and the measurement apparatus b, c or d makes measurements.

(2) Second Exemplary Structure

Only the measurement apparatus b measures the reference origins of the reference-image and the measurement-image, an image extreme point, a measurement origin and a measurement point of the reference-image.

(3) Third Exemplary Structure

The measurement apparatus c at location A designates a reference origin of the reference-image, and measures an image extreme point and a measurement point of the reference-image, and the measurement apparatus d at location B designates a measurement origin of the measurement-image, and measures an image extreme point and a measurement point of the reference-image.

Figure 20:
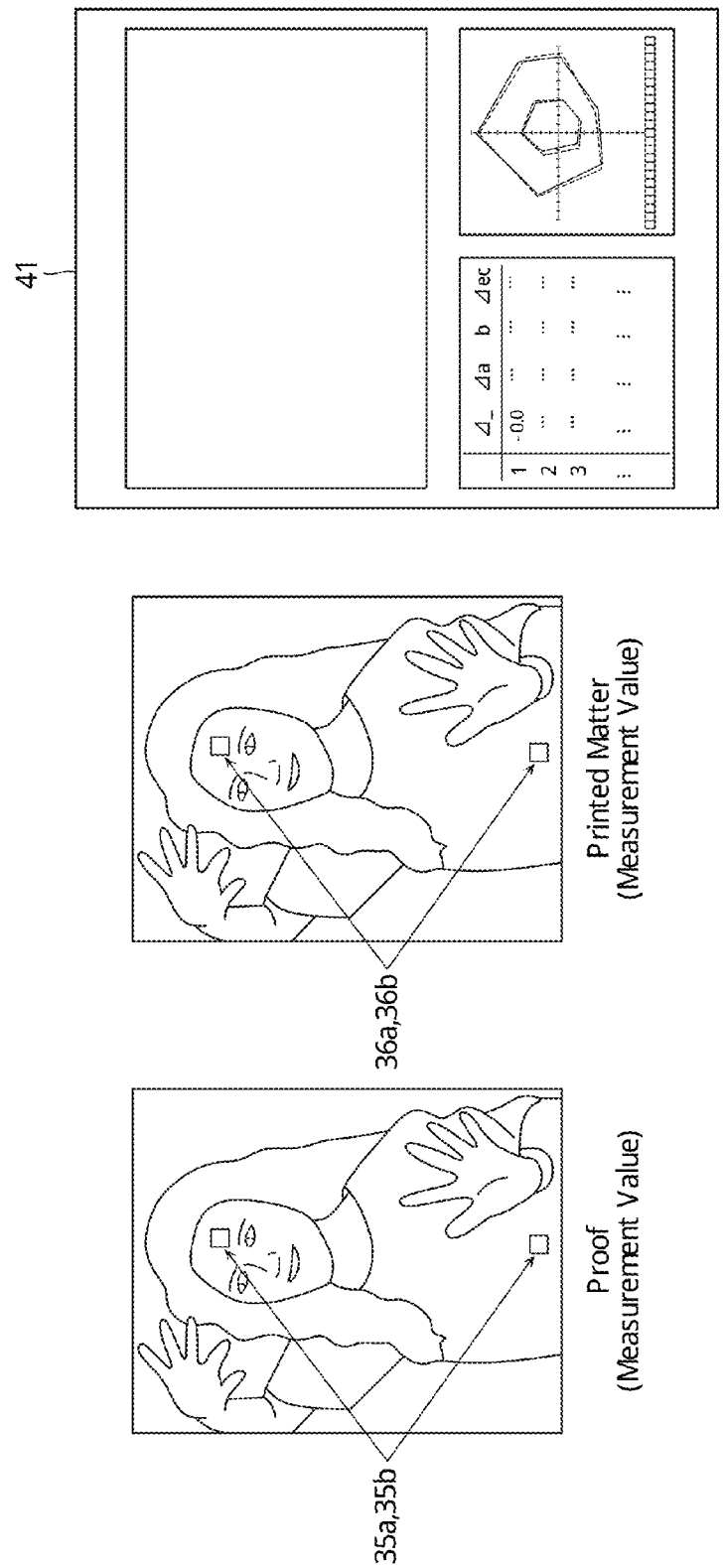
FIG. 20 is a diagram for explaining a color quality evaluation report in same measurement system.
Figure 21:
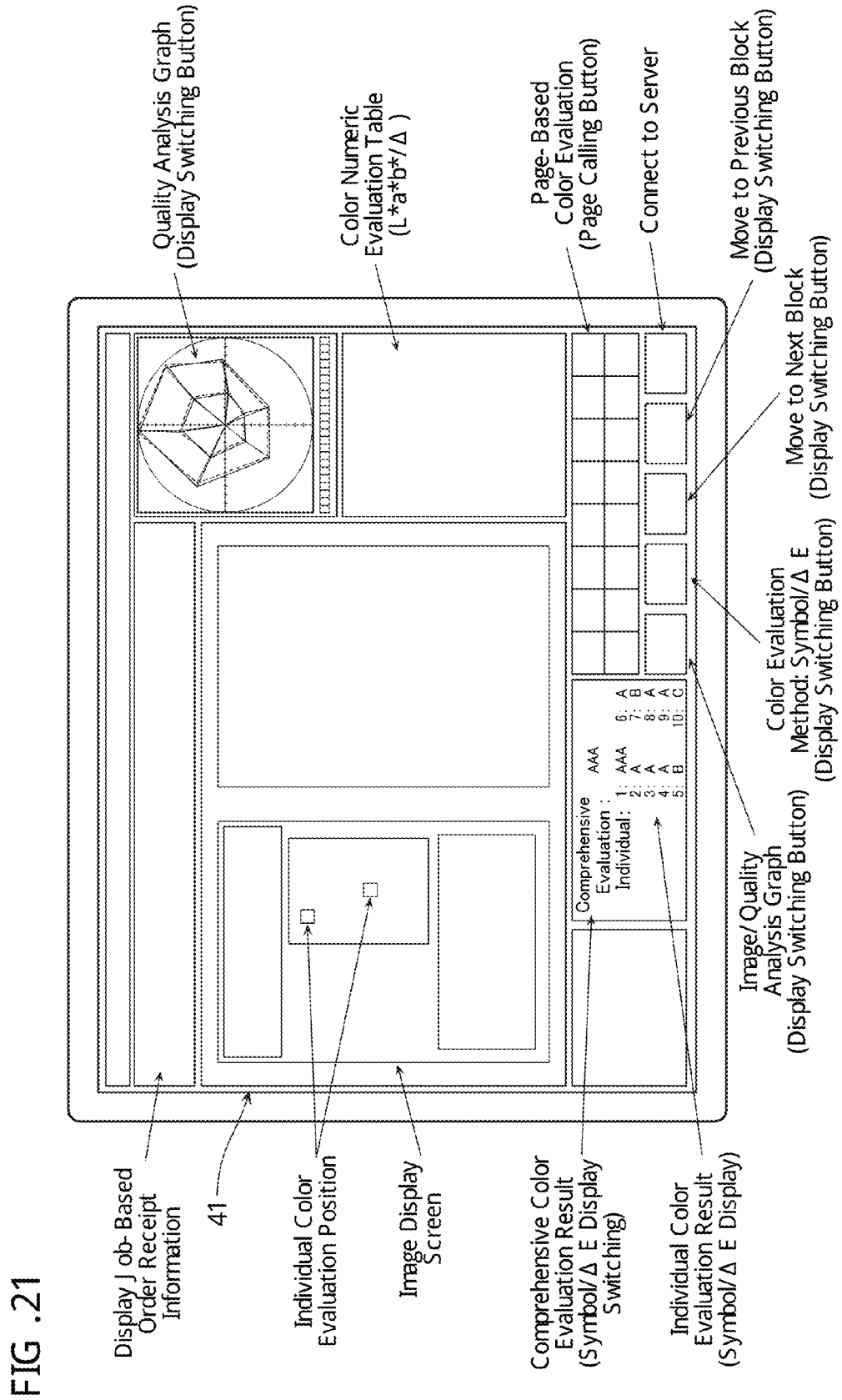
FIG. 21 is a diagram for explaining the color quality evaluation report.

FIG. 20 and FIG. 21 are the diagrams for explaining color quality evaluation reports in the measurement system. As illustrated in FIG. 20 and FIG. 21, a color quality evaluation report 41 not only displays therein a L*a*b* value of each measurement point 35a, 35b on the final contract proof 37 as well as a L*a*b* value and a color difference (ΔE) of each measurement point 36a, 36b on the printed matter 38 but also displays therein ΔE by use of alphabets or evaluation symbols in a stepwise manner, thereby employing a notation method which typically seems easy to grasp. The color quality evaluation report 41 may be displayed on the display screen of the display unit 22 in the PC 20 illustrated in FIG. 21.

The color quality evaluation report 41 is created based on a color evaluation table for finding a L*a*b* value and a color difference of each measurement point 35a, 35b, 36a, 36b. The created color quality evaluation report 41 displays therein, for example, job-based order receipt information indicating print job information, images such as the reference-image 47 and the measurement-image 48, quality analysis graph indicating quality analysis results, individual color evaluation position individually indicating color evaluation positions (measurement points), numeric color evaluation table indicating color evaluation results in numerals such as L*a*b* values and color differences ΔE, comprehensive color evaluation result indicating comprehensive color evaluation results, individual color evaluation result indicating individual color evaluation results, and the like. The color evaluation result is configured such that evaluation symbols and color difference ΔE can be switched to be displayed. Various display switching buttons, a page reading button, a button for instructing to connect to the server of the information processing apparatus 80a, and the like may be displayed on the display screen displaying the color quality evaluation report 41 thereon.

The color evaluation information can be saved in the server of the information processing apparatus 80a, for example, and can be immediately confirmed by the operator of the printer 130 to be used for color adjustments in the printer 130 via an enterprise network or wireless LAN, and the ink keys can be directly controlled with a constructed interface with the printer 130. Further, the results can be confirmed during printing or after printing also in the color management department or sales department, which can reduce the opportunities of visiting the printing factory at a distant location for monitoring the printing, or client's monitoring the printing, thereby enhancing the working efficiency of the entire work and reducing cost.

As described above, with the measurement apparatus, the measurement method, the information processing apparatus, and the measurement program according to the exemplary embodiments, the measurement values at the same positions between the reference-image and the measurement-image can be compared and evaluated in inexpensively-configurable and a series of simple processing.

The measurement program used for the controller 20 in the XY table device 110 or the computer 120 in the measurement apparatus 100 described according to the exemplary embodiments can be realized by executing a previously-prepared measurement program on the controller 20, the computer main body 40 of the computer 120, or separately-provided various computer devices such as work station. The measurement program is recorded in various recording mediums readable by a computer device such as HD, DVD, and memory card, and is read by the computer device from the recording medium to be executed. Further, the measurement program can be distributed via a transmission medium such as Internet.

REFERENCE SIGNS LIST

10: Measurement instrument
11: Lens unit

12: Spectroscopy unit
13: Control unit
14: I/O interface
18: Measurement aperture unit
18a: Measurement mark
19: Measurement instrument main body
20: Controller
21: Control unit
22: Display unit
23: Input unit
24: Memory
25: Storage unit
30: Drive unit
31: X axis support member
32: Y axis support member
33a: Reference origin
33b, 33c: Reference point
34a: Measurement origin
34b, 34c: Reference point
35a, 35b: Measurement point
36a, 36b: Measurement point
37: Final contract proof
37a, 38a: Cutting mark
37b, 38b: Center register mark
38: Printed matter
40: Computer main body
41: Color quality evaluation report
47: Reference-image
47a, 47b: Picture image
47c: Control strip image
48: Measurement-image
48a, 48b: Picture image
48c: Control strip image
50: Input device
51: Keyboard
52: Mouse
60: Display
61: Display screen
80a, 80b: Information processing apparatus
100: measurement apparatus
101: Measurement system
110: XY table device
120: Computer

The invention claimed is:

1. A measurement apparatus comprising:
a table capable of placing thereon a medium displaying a reference-image including a displayed reference origin or a measurement-image including a displayed measurement origin corresponding to the reference origin;
a measurement instrument for measuring an arbitrary measurement point in the medium placed on the table;
a movement mechanism for movably supporting the measurement instrument relative to the table;
a position detection means for detecting a position of the measurement instrument in a coordinate system of the table;
an input means for inputting the measurement origin;
a computation means for calculating a position of a measurement point of the measurement-image in the coordinate system of the table based on the positions of the reference origin and a measurement point of the reference-image, and the measurement origin of the measurement-image input by the input means; and
a control means for comparing the calculated position of the measurement point of the measurement-image with the position of the measurement instrument detected by the position detection means, and controlling the measurement instrument to be positioned at the calculated measurement point of the measurement image; wherein the computation means comprises:
a reference coordinate calculation means for calculating a reference coordinate value indicating a coordinate value of the measurement point in a coordinate system of the reference-image based on reference image structure information configuring the reference-image; and
a measurement coordinate calculation means for comparing the reference origin and the measurement origin to calculate coordinate correction information of a coordinate system of the measurement-image relative to the coordinate system of the reference-image based on measurement image structure information configuring the measurement-image, and for correcting the position of the measurement origin based on the coordinate correction information to correct the reference coordinate value and calculating a measurement coordinate value indicating a coordinate value of the measurement point in the coordinate system of the measurement-image corresponding to the measurement point of the reference-image, and
wherein the control means
(i) comprises a drive means configured to move the measurement instrument to the calculated measurement point of the measurement-image,
(ii) acquires the measurement values of the measurement points of the reference-image and the measurement-image based on the reference coordinate value and the measurement coordinate value, and compares and evaluates the measurement values of the corresponding measurement points of the reference-image and the measurement-image to calculate comparative evaluation information, and
(iii) moves the measurement instrument to the measurement point by the drive means based on at least one of the reference coordinate value and the measurement coordinate value for at least one of the reference-image and the measurement-image to acquire the measurement value.

2. The measurement apparatus according to claim 1, wherein the input means inputs the positions of the reference origin and the measurement point of the reference-image and a measurement value of the measurement point of the reference-image, and
the computation means compares and evaluates the measurement value of the medium by the measurement instrument at the measurement point where the measurement instrument is positioned by the control means, and the measurement value of the measurement point of the reference-image input by the input means to calculate comparative evaluation information.

3. The measurement apparatus according to claim 1, wherein the input means inputs the positions of the reference origin and the measurement point using the position detection means by moving the measurement instrument to the positions of the reference origin and the measurement point of the reference-image using the movement mechanism,
the measurement instrument measures the reference-image at the position of the measurement point, and
the computation means compares and evaluates a measurement value of the measurement-image by the measurement instrument at the measurement point where the measurement instrument is positioned by the control means, and a measurement value of the measurement point of the reference-image by the measurement instrument to calculate comparative evaluation information.

4. The measurement apparatus according to claim 1, wherein the coordinate correction information includes scale information of the measurement-image relative to the reference-image, which is calculated based on the reference image structure information and the measurement image structure information.

5. The measurement apparatus according to claim 1, further comprising:
a storage means for storing measurement information indicating a measurement result and a measurement history of a measurement value of the measurement point indicated by the reference coordinate value as reference data in association with the reference-image and the reference image structure information, and
storing measurement information indicating a measurement result and a measurement history of a measurement value of the measurement point indicated by the measurement coordinate value as measurement data including the comparative evaluation information in association with the measurement-image and the measurement image structure information.

6. The measurement apparatus according to claim 1, further comprising:
a color adjustment means for calculating color adjustment information that is used for a color adjustment of a printer to print at least one of the reference-image and the measurement-image based on the comparative evaluation information.

7. The measurement apparatus according to claim 1, wherein the reference-image and the measurement-image each include at least one of a picture image and a control strip image,
the measurement point is set on at least one of the picture image and the control strip image, and
the measurement value includes color information at the measurement point on at least one of the picture image and the control strip image.

8. The measurement apparatus according to claim 1, wherein the reference-image and the measurement-image each include a picture image and a control strip image,
the measurement point is set on the picture image and the control strip image,
the measurement value includes color information at the measurement point on the picture image and the control strip image, and
the computation means additionally acquires a measurement value of the control strip image of an ink key sequence of the printer indicating the same color information as the color information in the measurement value of the picture image acquired at the measurement point by moving the measurement instrument by the drive means for the reference-image and the measurement-image, and further compares and evaluates the color information in the measurement value of the picture image and the color information in the measurement value of the control strip image.

9. The measurement apparatus according to claim 8, wherein the computation means compares a color difference at each of the measurement points as a CMYK ink correction amount based on the values obtained by converting the measurement values of the reference-image and the measurement-image into a halftone dot percent using a color conversion table, or the measured density values, and calculates color evaluation information indicating an entire color gradation reproduction state of the picture image by plotting all the measurement results of the picture image and the control strip image on a graph indicating increase/decrease relationships of a measurement value of the measurement-image relative to a measurement value of the reference-image.

10. The measurement apparatus according to claim 7, wherein the computation means further compares and evaluates an additionally-acquired measurement value of a preset color, and a measurement value of at least one of the reference-image and the measurement-image.

11. An information processing apparatus for transmitting at least information on the reference origin and the measurement point out of the information on the reference origin and the measurement point of the reference-image and information on the measurement value of the measurement point to the measurement apparatus according to claim 1 via a network.

12. The measurement apparatus according to claim 1, for receiving at least information on the reference origin and the measurement point out of the information on the reference origin and the measurement point of the reference-image and information on the measurement value of the measurement point via a network.

13. The measurement apparatus according to claim 12, for measuring a measurement value of the measurement point of the reference-image based on the information on the reference origin and the measurement point of the reference-image received via the network, and transmitting the reference origin and the measurement point of the reference-image and the measured measurement value of the measurement point via the network.

14. A measurement method comprising:
inputting a reference origin of a reference-image by an input means;
designating a measurement point of the reference-image by the input means;
calculating a reference coordinate value indicating the measurement point based on reference image structure information configuring the reference-image;
acquiring a measurement value of the measurement point of the reference-image based on the reference coordinate value;
inputting a measurement origin of a measurement-image to be compared and evaluated with the reference-image by the input means;
comparing the reference origin and the measurement origin to calculate coordinate correction information on a coordinate system of the measurement-image relative to a coordinate system of the reference-image based on measurement image structure information configuring the measurement-image;
correcting the position of the measurement origin based on the coordinate correction information to correct the reference coordinate value, and calculating a measurement coordinate value indicating a coordinate value of the measurement point in the coordinate system of the measurement-image corresponding to the measurement point of the reference-image;
acquiring a measurement value of the measurement point of the measurement-image based on the measurement coordinate value; and
comparing and evaluating the measurement values of the corresponding measurement points of the reference-image and the measurement-image to calculate comparative evaluation information, a measurement instrument being moved to the measurement point for at least one of the reference-image and the measurement-image to acquire the measurement value in the measurement value acquisition step.

15. A measurement program stored in a non-transitory computer readable storage medium using a measurement apparatus, the measurement apparatus comprising:

a measurement instrument for detecting a measurement value of an arbitrary measurement point in at least one of a reference-image and a measurement-image to be compared and evaluated with the reference-image, a drive means configured to move the measurement instrument to the measurement point, an input means for inputting a reference origin and the measurement point of the reference-image and a measurement origin of the measurement-image, a reference coordinate calculation means for calculating a reference coordinate value indicating a coordinate value of the input measurement point in a coordinate system of the reference-image based on reference image structure information configuring the reference-image, a measurement coordinate calculation means for comparing the reference origin and the measurement origin to calculate coordinate correction information on a coordinate system of the measurement-image relative to the coordinate system of the reference-image based on measurement image structure information configuring the measurement-image, and correcting the position of the measurement origin based on the coordinate correction information to correct the reference coordinate value, and calculating a measurement coordinate value indicating a coordinate value of the measurement point in the coordinate system of the measurement-image corresponding to the measurement point of the reference-image, and a computation means for acquiring the measurement values of the measurement points of the reference-image and the measurement-image based on the reference coordinate value and the measurement coordinate value, and comparing and evaluating the measurement values of the corresponding measurement points of the reference-image and the measurement-image to calculate comparative evaluation information, the measurement program for causing a computer to perform the steps of:

inputting the reference origin and the measurement point;

calculating the reference coordinate value;

acquiring a measurement value of the measurement point of the reference-image;

inputting the measurement origin;

calculating the coordinate correction information;

calculating the measurement coordinate value;

acquiring a measurement value of the measurement point of the measurement-image; and calculating the comparative evaluation information, the measurement instrument being moved to the measurement point by the drive means based on at least one of the reference coordinate value and the measurement coordinate value for at least one of the reference-image and the measurement-image to detect the measurement value in the measurement value acquisition step.

* * * * *